United States Patent
Takahashi et al.

(10) Patent No.: US 11,269,280 B2
(45) Date of Patent: Mar. 8, 2022

(54) SHEET PROCESSING DEVICE, LAMINATOR, IMAGE FORMING APPARATUS, AND IMAGE FORMING SYSTEM

(71) Applicant: Ricoh Company, Ltd., Tokyo (JP)

(72) Inventors: Wataru Takahashi, Tokyo (JP); Tomohiro Furuhashi, Kanagawa (JP); Sho Asano, Kanagawa (JP); Yoshito Suzuki, Chiba (JP); Shinya Monma, Kanagawa (JP); Joji Akiyama, Kanagawa (JP); Yohsuke Haraguchi, Kanagawa (JP); Wataru Nozaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/316,899

(22) Filed: May 11, 2021

(65) Prior Publication Data
US 2021/0356899 A1    Nov. 18, 2021

(30) Foreign Application Priority Data
May 13, 2020 (JP) .............................. JP2020-084777

(51) Int. Cl.
*G03G 15/20* (2006.01)
*G03G 15/00* (2006.01)

(52) U.S. Cl.
CPC ................................ *G03G 15/6585* (2013.01)

(58) Field of Classification Search
CPC .... G03G 15/01; G03G 15/50; G03G 15/6585; G03G 15/6588; G03G 15/6591
See application file for complete search history.

(56) References Cited

U.S. PATENT DOCUMENTS

| | | | | |
|---|---|---|---|---|
| 5,894,318 | A * | 4/1999 | Endo | G03G 15/2064 |
| | | | | 347/262 |
| 8,059,982 | B2 * | 11/2011 | Carlson | G03G 15/2064 |
| | | | | 399/67 |
| 2018/0257900 | A1 | 9/2018 | Suzuki et al. | |
| 2019/0010011 | A1 | 1/2019 | Watanabe et al. | |
| 2019/0028401 | A1 | 9/2019 | Shinji et al. | |
| 2019/0276263 | A1 | 9/2019 | Hidaka et al. | |
| 2019/0284008 | A1 | 9/2019 | Sakano et al. | |
| 2019/0284009 | A1 | 9/2019 | Suzuki et al. | |

(Continued)

FOREIGN PATENT DOCUMENTS

| | | |
|---|---|---|
| JP | 9-164593 | 6/1997 |
| JP | 2006-160429 | 6/2006 |

*Primary Examiner* — Hoang X Ngo
(74) *Attorney, Agent, or Firm* — Xsensus LLP

(57) ABSTRACT

A sheet processing device inserts a sheet-shaped medium into a two-ply sheet in which two sheets are overlaid and partially bonded. The sheet processing device includes control circuitry to execute a single insertion mode in which one sheet-shaped medium is inserted into the two-ply sheet and a multiple insertion mode in which a plurality of sheet-shaped media are inserted into the two-ply sheet along a conveyance direction. The control circuitry inserts the one sheet-shaped medium into the two-ply sheet in the single insertion mode and the plurality of sheet-shaped media into the two-ply sheet in the multiple insertion mode, with the two-ply sheet being stopped.

10 Claims, 19 Drawing Sheets

(56) References Cited

U.S. PATENT DOCUMENTS

| | | |
|---|---|---|
| 2019/0284011 A1 | 9/2019 | Furuhashi et al. |
| 2019/0284012 A1 | 9/2019 | Yoneyama et al. |
| 2019/0367317 A1 | 12/2019 | Haraguchi et al. |
| 2020/0140222 A1 | 5/2020 | Takahashi et al. |
| 2020/0239265 A1 | 7/2020 | Suzuki et al. |
| 2020/0247107 A1 | 8/2020 | Morinaga et al. |
| 2020/0247636 A1 | 8/2020 | Furuhashi et al. |
| 2020/0270093 A1 | 8/2020 | Suzuki et al. |
| 2020/0338877 A1 | 10/2020 | Takahashi et al. |
| 2020/0341414 A1 | 10/2020 | Watanabe et al. |
| 2020/0385231 A1 | 12/2020 | Kunieda et al. |
| 2020/0407187 A1 | 12/2020 | Hidaka et al. |
| 2021/0039900 A1 | 2/2021 | Shimazu et al. |
| 2021/0039916 A1 | 2/2021 | Sugiyama et al. |

* cited by examiner

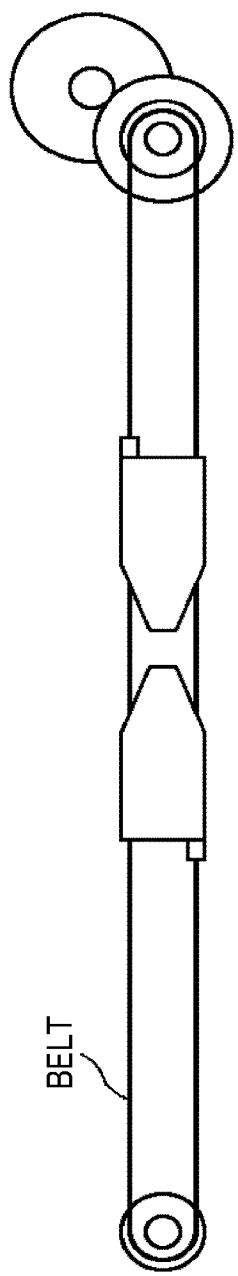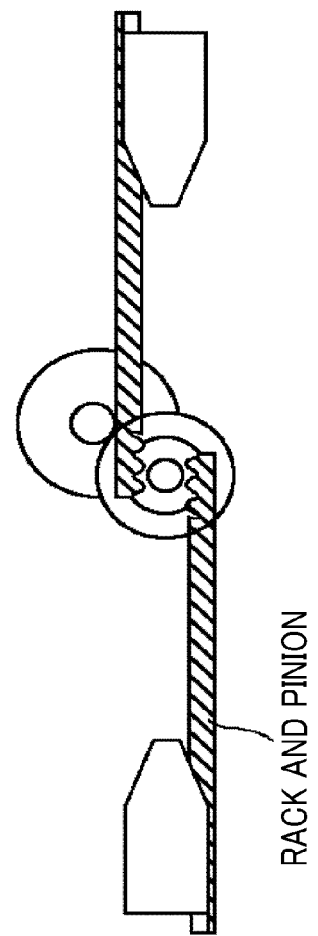

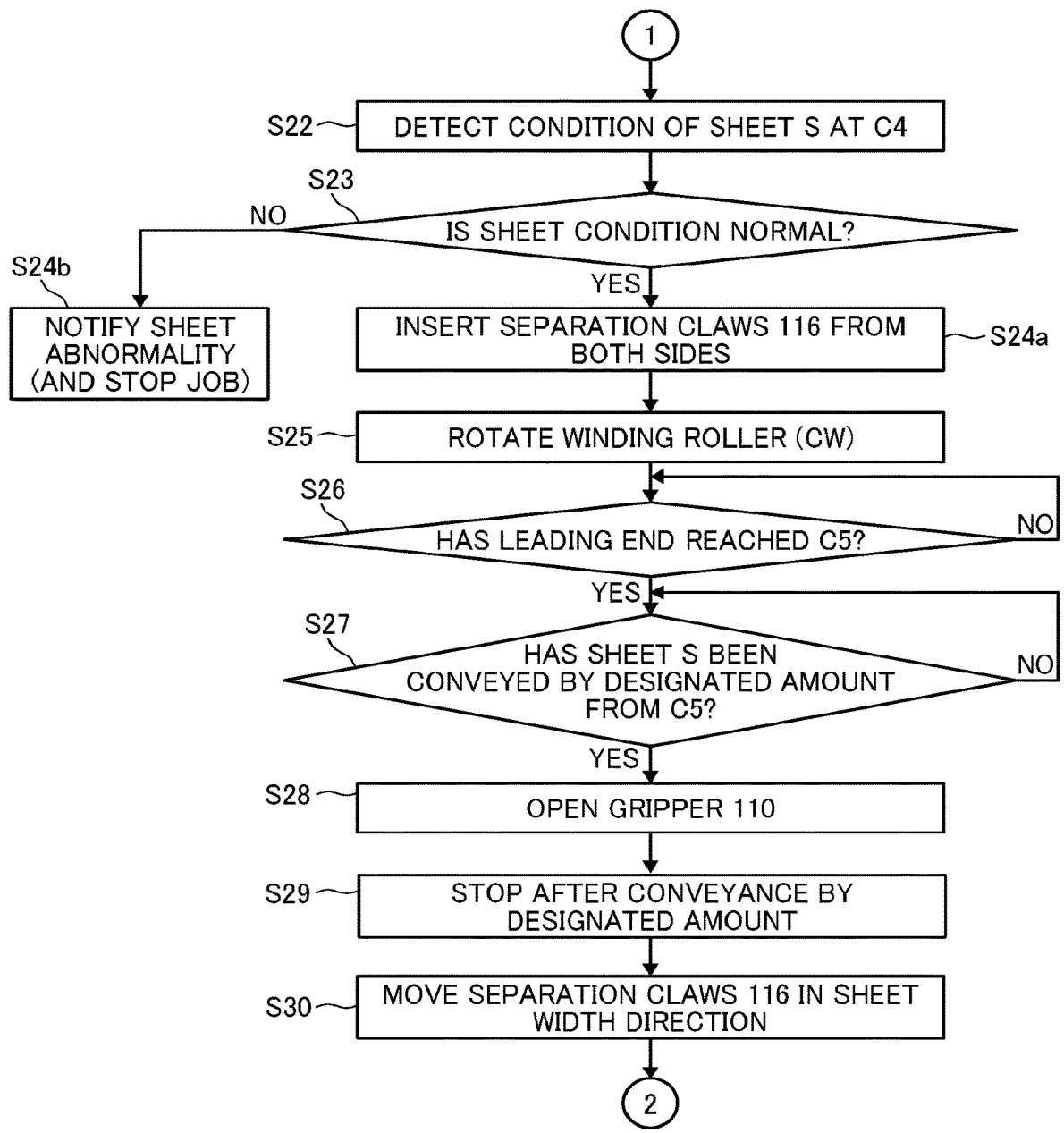

SHEET PROCESSING DEVICE, LAMINATOR, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Unexamined Patent Application Publication No. 2020-084777, filed on May 13, 2020, in the Japan Patent Office, the entire disclosure of which is incorporated by reference herein.

BACKGROUND

Technical Field

Aspects of the present disclosure relate to a sheet processing device, a laminator, an image forming apparatus, and an image forming system.

Related Art

There is known a lamination technology of inserting an inner sheet (e.g., paper or photo) between a two-ply lamination sheet or lamination film (e.g., a lamination pouch or lamination folder) and applying heat and pressure to the two-ply lamination sheet to bond the two-ply lamination sheet. The two-ply sheet is made of two sheets (plies) bonded (sealed) on one side as if one sheet is folded.

SUMMARY

In an aspect of the present disclosure, there is provided a sheet processing device that inserts a sheet-shaped medium into a two-ply sheet in which two sheets are overlaid and partially bonded. The sheet processing device includes control circuitry to execute a single insertion mode in which one sheet-shaped medium is inserted into the two-ply sheet and a multiple insertion mode in which a plurality of sheet-shaped media are inserted into the two-ply sheet along a conveyance direction. The control circuitry causes the one sheet-shaped medium to be inserted into the two-ply sheet with the two-ply sheet being stopped in the single insertion mode and causes the plurality of sheet-shaped media to be inserted into the two-ply sheet with the two-ply sheet being stopped in the multiple insertion mode.

In another aspect of the present disclosure, there is provided a laminator that includes the sheet processing device and a heat pressing member to heat and press the two-ply sheet.

In still another aspect of the present disclosure, there is provided an image forming apparatus that includes the sheet processing device and an image forming device to form an image on the sheet-shaped medium, In still yet another aspect of the present disclosure, there is provided an image forming system that includes an image forming apparatus and the sheet processing device.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIGS. 20A and 20B are schematic views illustrating examples of a drive configuration of the separation claw illustrated in FIG. 19;

FIGS. 28A to 28C are flowcharts illustrating a series of processes from sheet feeding to insertion of the inner sheet and completion of the laminating process.

Figure 1:
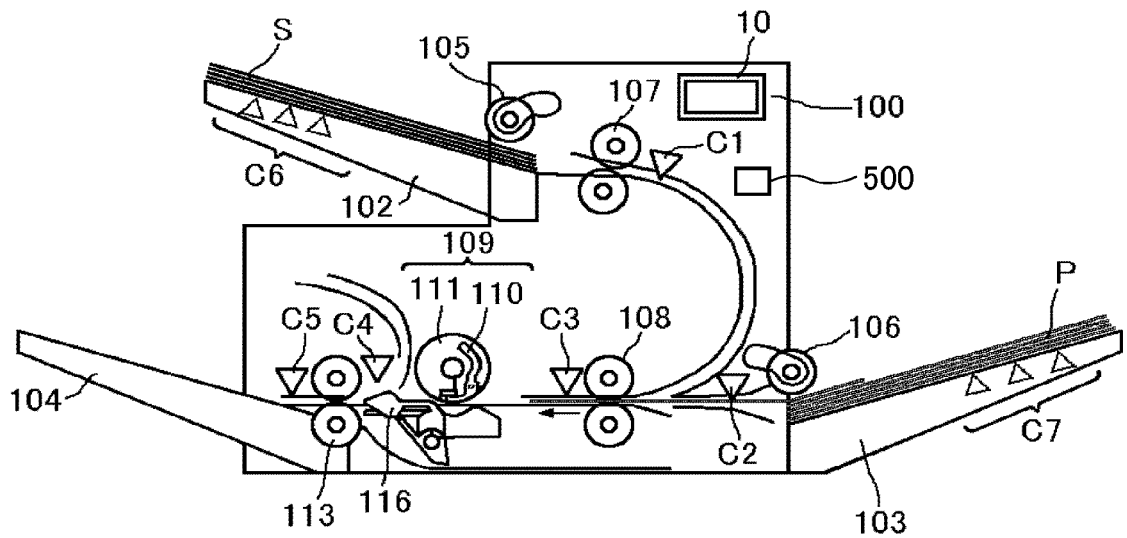
FIG. 1 is a schematic view illustrating an overall configuration of a sheet processing device according to one embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a schematic view illustrating a general arrangement of a sheet processing device according to one embodiment of the present disclosure. A sheet processing device 100 according to the present embodiment is to separate two sheets (plies) of a two-ply sheet (hereinafter referred to as a lamination sheet S) and to insert and sandwich a sheet-shaped medium (hereinafter referred to as an inner sheet P) between the separated sheets of the two-ply sheet.

The lamination sheet S is a two-ply sheet constructed of two overlapping sheets (plies) and bonded (or joined) at one portion (or on one side). For example, there is a two-ply sheet in which a first side is a transparent sheet such as a transparent polyester sheet and the opposite side is a transparent or opaque sheet and bonded to the other sheet on one side thereof. The two-ply sheet also includes a lamination film.

The inner sheet P is an example of the sheet medium that is inserted into the two-ply sheet. The sheet medium may be thick paper, postcards, envelopes, plain paper, thin paper, coated paper, art paper, tracing paper, overhead projector (OHP) transparencies, and the like.

As illustrated in FIG. 1, a sheet processing device 100 includes a sheet tray 102 as a first loader on which the lamination sheet S is loaded, and a pickup roller 105 that feeds the lamination sheet S from the sheet tray 102, and a conveying roller pair 107. The sheet processing device 100 further includes a sheet tray 103 as a second loader on which the inner sheet P is loaded, and a pickup roller 106 that feeds the inner sheet P from the sheet tray 103.

In the sheet tray 102, a sheet size sensor C6 is disposed. The sheet size sensor C6 serves as a sheet size detector to detect the size of the lamination sheet S that is a length of the lamination sheet S in a conveyance direction. In the sheet tray 103, a sheet size sensor C7 is disposed. The sheet size sensor C7 serves as a medium size detector to detect the size of the inner sheet P that is a length of the inner sheet P in a conveyance direction.

Each of the sheet size sensor C6 and the sheet size sensor C7 includes a plurality of sensors arranged side by side in the conveyance direction. Since the detection results of the sensors change depending on the size of the loaded lamination sheet S (or the inner sheet P), the sheet size sensors C6 and C7 can detect the length of the lamination sheet S (or the inner sheet P) in the conveyance direction.

A sheet sensor C1 to detect the position of the lamination sheet S being conveyed is disposed downstream from the conveying roller pair 107 in the conveyance direction of the lamination sheet S. A sheet sensor C2 to detect the position of the inner sheet P being conveyed is disposed downstream from the pickup roller 106 in the conveyance direction of the inner sheet P.

The sheet sensors C1 and C2 may be used to detect the length of the lamination sheet S (or the inner sheets P) in the conveyance direction.

Downstream from the conveying roller pair 107 and the pickup roller 106 in the sheet conveyance direction, the sheet processing device 100 further includes an entrance roller pair 108 as a first conveyor, a winding roller 109 as a rotator, an exit roller pair 113 as a second conveyor, and an output tray 104. The sheet processing device 100 further includes a separation claw 116 between the winding roller 109 and the exit roller pair 113. The separation claw 116 is movable in the width direction of the sheet S.

A sheet sensor C3 to detect the position of the lamination sheet S and the inner sheet P being conveyed is disposed downstream from the entrance roller pair 108 in the conveyance direction. An abnormality detector C4 to detect the state of the lamination sheet S is disposed downstream from the winding roller 109 in the conveyance direction. A sheet sensor C5 to detect the position of the lamination sheet S being conveyed is disposed downstream from the exit roller pair 113 in the conveyance direction.

The pickup roller 105, the conveying roller pair 107, the entrance roller pair 108, and the winding roller 109 are examples of a first feeder to feed a two-ply sheet. The pickup roller 106, the entrance roller pair 108 and the winding roller 109 are examples of a second feeder.

On the exterior of the sheet processing device 100, an operation panel 10 is provided as a display and operation device that displays information on the sheet processing device 100 and receives operation input. Further, the operation panel 10 also serves as a notification device to output a perceptual signal to a user. As an alternative, a notification device other than the operation panel 10 may be separately provided in the sheet processing device 100.

The sheet processing device 100 according to the present embodiment stores the lamination sheet S and the inner sheet P on separate trays. The sheet processing device 100 separates and opens the lamination sheet S and inserts the inner sheet P therein while conveying the lamination sheet S. Then, the exit roller pair 113 ejects and loads the lamination sheet S, in which the inner sheet P is inserted, onto the output tray 104.

Figure 2:
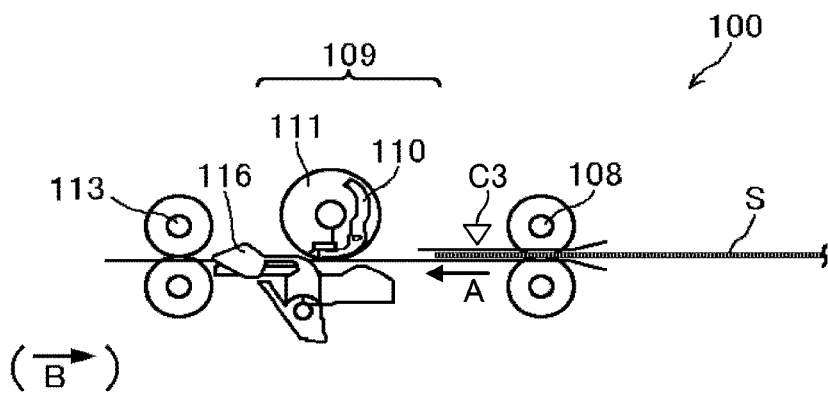
FIG. 2 is a schematic view illustrating a main part of the sheet processing device in FIG. 1, conveying a lamination sheet toward a winding roller.

FIG. 2 is a view of illustrating a main part of the sheet processing device 100 illustrated in FIG. 1. As illustrated in FIG. 2, each of the entrance roller pair 108 and the exit roller pair 113 is, for example, two rollers paired with each other and driven by a driver (e.g., a motor). The entrance roller pair 108 rotates in one direction, whereas the exit roller pair 113 rotates in forward and reverse directions, thereby nipping and conveying the lamination sheet S and the inner sheet P.

The entrance roller pair 108 conveys the lamination sheet S and the inner sheet P toward the exit roller pair 113. The conveyance direction indicated by arrow A is also referred to as a forward conveyance direction or a direction A.

In contrast, the exit roller pair 113 can switch the direction of rotation between the forward direction and the reverse direction. The exit roller pair 113 can convey the nipped lamination sheet S in the forward conveyance direction toward the output tray 104 (see FIG. 1) and the reverse direction in which the lamination sheet S is drawn back toward the winding roller 109. The conveyance direction toward the winding roller 109 (the direction indicated by arrow B and reverse to the forward conveyance direction) is referred to as the reverse conveyance direction or a direction B.

Between the entrance roller pair 108 and the exit roller pair 113, the sheet processing device 100 further includes the winding roller 109 that is a rotator and the separation claw 116. The winding roller 109 is rotationally driven in the forward and reverse directions by the driver (e.g., the motor), and the direction of rotation can be switched between the forward direction and the reverse direction (clockwise and counterclockwise).

The winding roller 109 includes a roller member 111 and a movable gripper 110 disposed on the roller member 111 to grip the lamination sheet S. The movable gripper 110 grips a leading end of the lamination sheet S together with the roller member 111. The gripper 110 may be integral with the outer circumference of the roller member 111, or may be a separate component.

With reference to FIGS. 1 to 18, a description is given of a series of processes of the sheet processing device 100, that is, operations from separation of the lamination sheet S to insertion of the inner sheet P. The controller (serving as control circuitry) 500 controls the series of processes to perform the operations. In FIGS. 3 to 18, elements identical to those illustrated in FIG. 1 or 2 are given identical reference numerals, and the descriptions thereof are omitted.

In FIG. 1, the lamination sheets S are loaded on the sheet tray 102 such that the bonded side is on the downstream side in the direction of feeding (that is, the conveyance direction) of the pickup roller 105. In the sheet processing device 100, the pickup roller 105 picks up the lamination sheet S from the sheet tray 102, and the conveying roller pair 107 conveys the lamination sheet S toward the entrance roller pair 108.

Next, as illustrated in FIG. 2, the entrance roller pair 108 conveys the lamination sheet S toward the winding roller 109. In the sheet processing device 100, the entrance roller pair 108 conveys the lamination sheet S with the bonded end (the bonded end is one of four sides) on the downstream side in the forward conveyance direction (in the direction indicated by arrow A).

Figure 3:
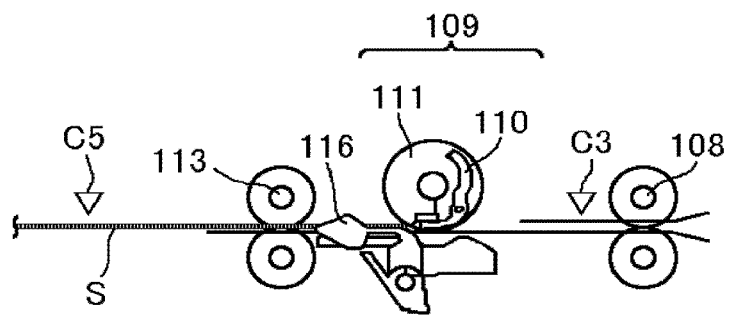
FIG. 3 is a schematic view illustrating the main part of the sheet processing device suspending sheet conveyance, subsequent to the state in FIG. 2.

Subsequently, as illustrated in FIG. 3, the controller 500 in the sheet processing device 100 suspends conveyance of the lamination sheet S after the rear end of the lamination sheet S in the forward conveyance direction passes the winding roller 109. These operations are triggered by detection of the leading end of the lamination sheet S by the sheet sensor C3, and are performed by conveying the designated amount from the sheet sensor C3.

Figure 4:
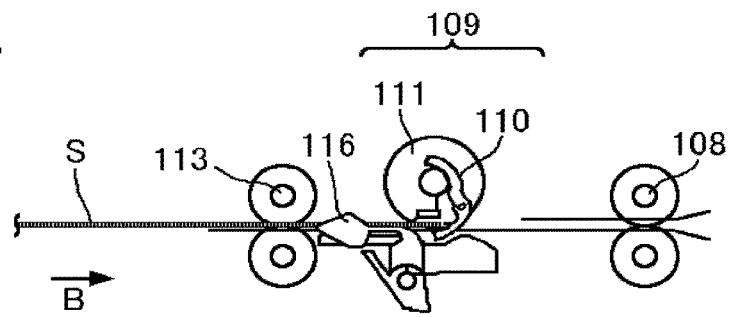
FIG. 4 is a schematic view illustrating the main part of the sheet processing device conveying the lamination sheet, subsequent to the state in FIG. 3.

Next, as illustrated in FIG. 4, the controller 500 in the sheet processing device 100 controls the driver to open the gripper 110, reverse the rotation direction of the exit roller pair 113, and convey the lamination sheet S in the reverse conveyance direction (direction B) toward the opened gripper 110.

Figure 5:
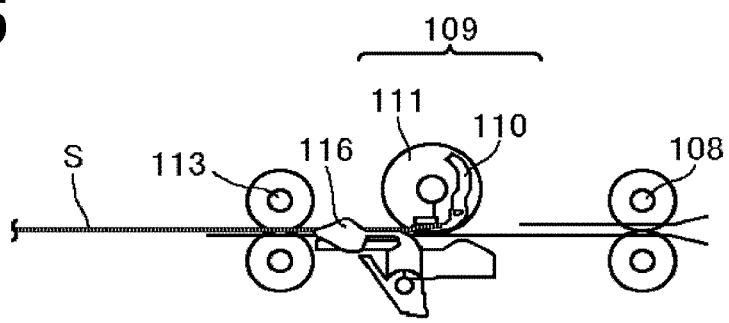
FIG. 5 is a schematic view illustrating the main part of the sheet processing device in a state subsequent to the state in FIG. 4.

Subsequently, as illustrated in FIG. 5, the controller 500 in the sheet processing device 100 controls the driver to suspend conveyance of the lamination sheet S when the end of the lamination sheet S is inserted in the gripper 110 and close the gripper 110 to grip the end of the lamination sheet S. These operations are performed by conveying the lamination sheet S by a specified amount.

Figure 6:
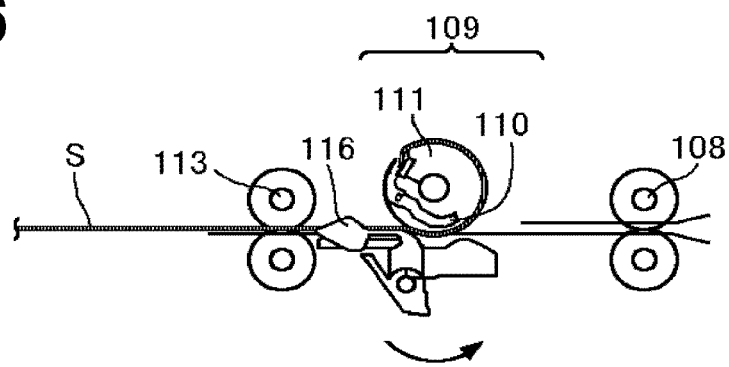
FIG. 6 is a schematic view illustrating the main part of the sheet processing device in which the winding roller rotates in reverse to wind the lamination sheet around the winding roller, subsequent to the state in FIG. 5.

Then, as illustrated in FIG. 6, the controller 500 in the sheet processing device 100 controls the driver to rotate the winding roller 109 counterclockwise in the drawings and wind the lamination sheet S around the winding roller 109. The lamination sheet S is wound around the winding roller 109 from the side where the two overlapping sheets of the lamination sheet S are not bonded.

Figure 7:
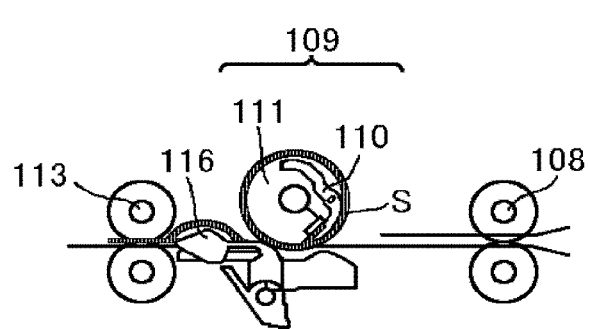
FIG. 7 is a schematic view illustrating the main part of the sheet processing device in which separation claws are inserted into a space between two sheets (plies) of the lamination sheet, subsequent to the state in FIG. 6.

As illustrated in FIG. 7, when the lamination sheet S is wound around the winding roller 109, a difference is created between the two sheets in the amount of winding of the lamination sheet S around circumference of the winding roller 109. There is a surplus of the inner ply, and slack is generated toward the bonded end of the lamination sheet S. As a result, a space is generated between the two sheets of the two-ply sheet. As inserting the separation claws 116 are inserted into the generated space from both sides of the lamination sheet S, the space between the two sheets can be reliably maintained. These operations are triggered by detection of the leading end of the lamination sheet S by the sheet sensor C5, and are performed by conveying the specified amount from the sheet sensor C5.

The separation claws 116 are described further.

Figure 19:
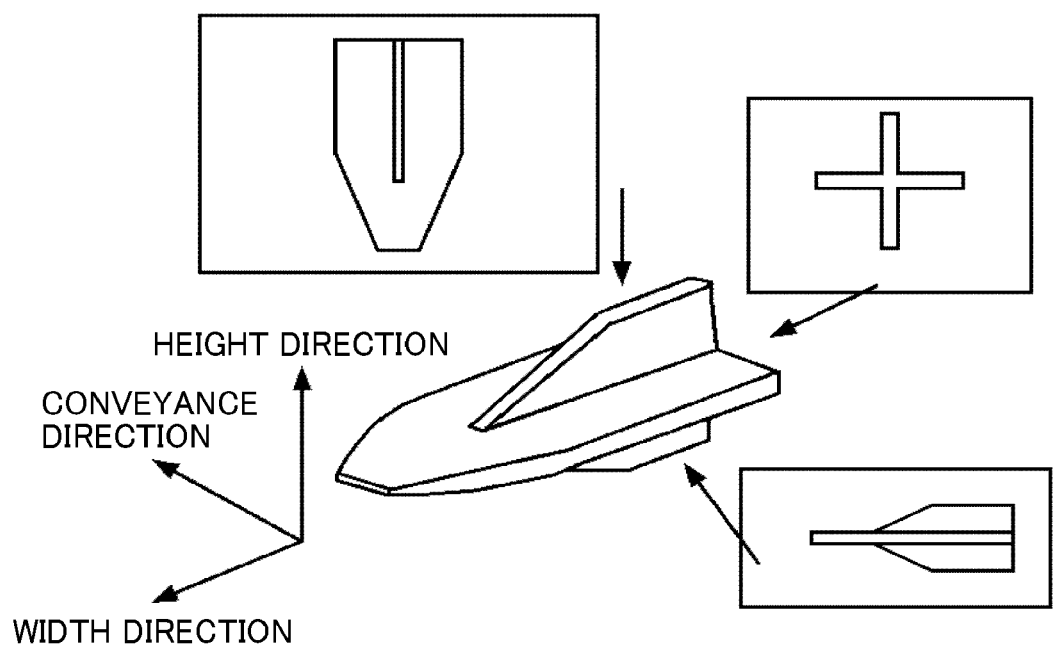
FIG. 19 is a schematic view of one of separation claws of the sheet processing device illustrated in FIG. 1.
Figure 21:
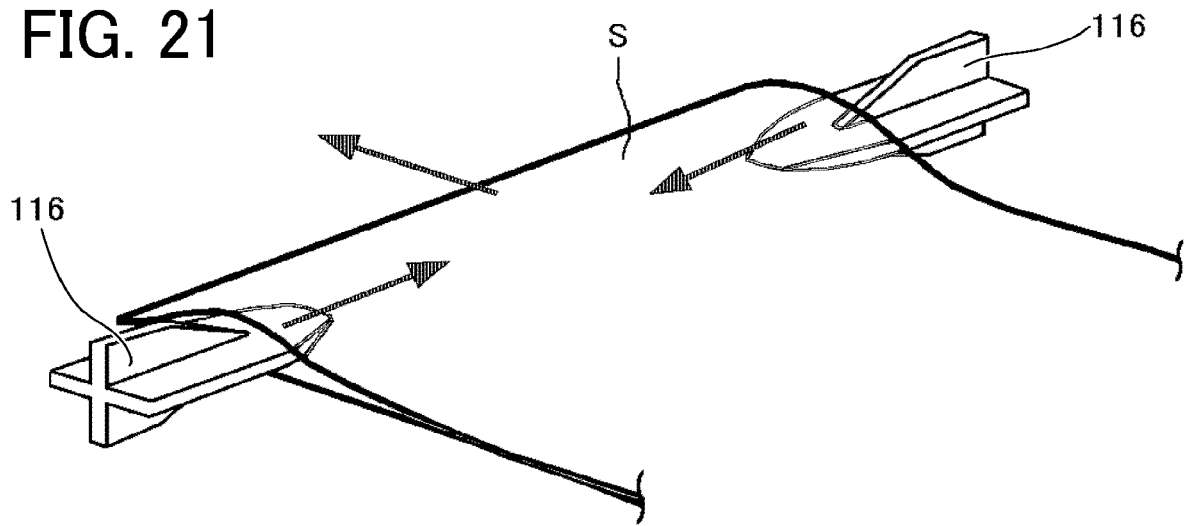
FIG. 21 is a perspective view illustrating a state in which the separation claws are inserted into a lamination sheet S.

FIG. 19 is a schematic view of the separation claw 116 of the sheet processing device 100. FIGS. 20A and 20B are schematic views illustrating an example of a drive configuration of the separation claw 116. Further, FIG. 21 is a perspective view illustrating a state in which the separation claw 116 is inserted in the lamination sheet S.

As illustrated in FIG. 19, when viewed from the upstream side in the conveyance direction, the height of the separation claw 116 gradually increases from the center in the width direction to the rear end in FIG. 19. Further, when viewed in the height direction, the size of the separation claw 116 in the conveyance direction gradually increase from the leading end to the center. When viewed in the width direction, the separation claw 116 is cross-shaped.

Further, in the present embodiment, referring to FIGS. 20A and 20B, the two separation claws 116 are disposed facing each other and moved in the approaching direction and the separating direction by a belt drive mechanism as illustrated in FIG. 20A, a rack and pinion mechanism illustrated in FIG. 20B, or the like.

As described above, in the present embodiment, the pair of separation claws 116 having the above-described shape is movable in the width direction of the lamination sheet S. Accordingly, the separation claws 116 can be smoothly inserted into the gap generated in the lamination sheet S as illustrated in FIG. 21.

Figure 8:
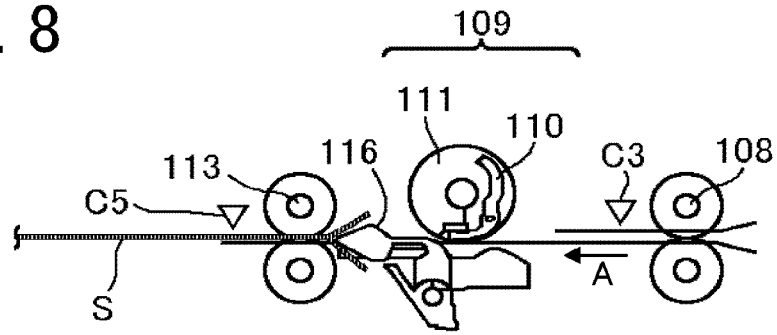
FIG. 8 is a schematic view illustrating the main part of the sheet processing device in which the winding roller rotates in a forward direction so as to move the space in the lamination sheet and the separation claws to the rear end of the lamination sheet.

A description of a series of operations of the sheet processing device 100 is continued below. With the separation claws 116 inserted in the space of the lamination sheet S, the controller 500 in the sheet processing device 100 controls the driver to rotate the winding roller 109 clockwise in the drawings (see FIG. 7) so as to move the space in the lamination sheet S to the rear end of the lamination sheet S in the forward conveyance direction (in the direction of arrow A) as illustrated in FIG. 8. After the winding roller 109 is rotated by a designated amount, the controller 500 in the sheet processing device 100 controls the driver to open the gripper 110. As a result, the rear end of the lamination sheet S is separated into the upper and lower sheets.

In this state, the controller 500 in the sheet processing device 100 controls the driver to temporarily stop the conveyance of the lamination sheet S and further move the separation claws 116 in the sheet width direction to separate the rear end of the lamination sheet S in the entire range. These operations are triggered by detection of the leading end of the lamination sheet S by the sheet sensor C5, and are performed by conveying the specified amount from the sheet sensor C5.

Figure 22:
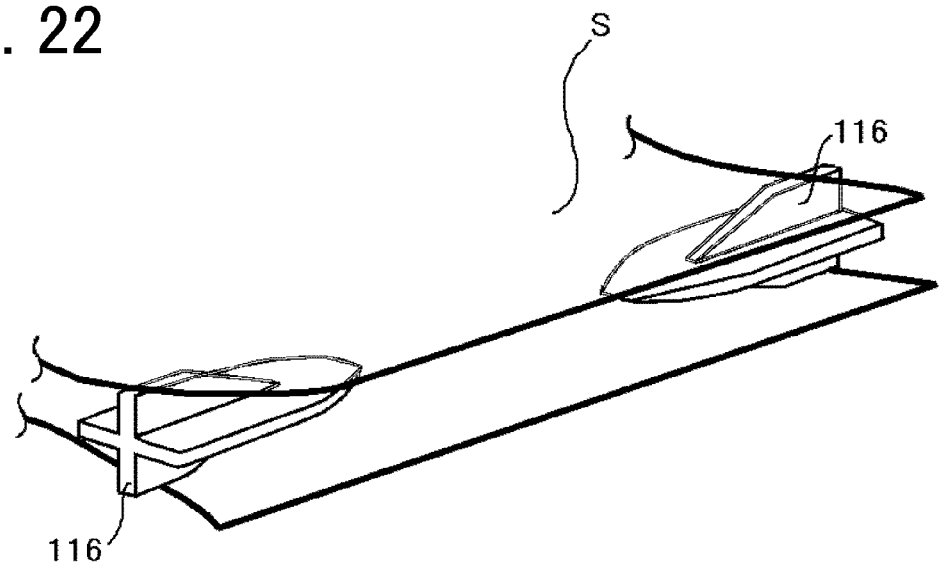
FIG. 22 is a perspective view illustrating a state of the separation claws and the lamination sheet S illustrated in FIG. 8.

FIG. 22 is a perspective view illustrating a state of the separation claws 116 and the lamination sheet S in FIG. 8. Since the separation claw 116 also has a shape (function) of a bifurcating claw that guides the separated sheets of the lamination sheet S in different directions due to the above-described shape (see FIG. 19), the two separated sheets of the lamination sheet S can be kept in postures to be conveyed to different paths.

Figure 23:
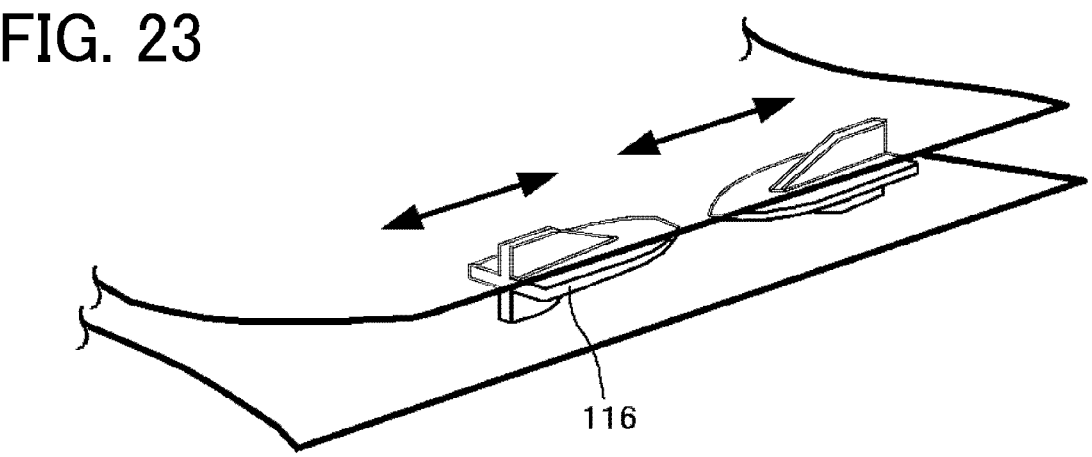
FIG. 23 is another perspective view illustrating a state of the separation claws and the lamination sheet S illustrated in FIG. 8.

Further, since the separation claws 116 are movable in the width direction (see FIGS. 20A and 20B), the separation claws 116 can be positioned suitably to support the postures of the sheets of the lamination sheet S as illustrated in FIG. 23. Therefore, even when the size of the lamination sheet S and the rigidity (or retentivity meaning the propensity to retain a particular shape once applied, such as curvature of paper) change, the separated sheets of the lamination sheet S can be guided in desired branching directions. This eliminates the need for a bifurcating member (e.g., the bifurcating claw) over the entire width of the conveyance path and a driver to drive the bifurcating member, and the cost can be reduced.

Figure 9:
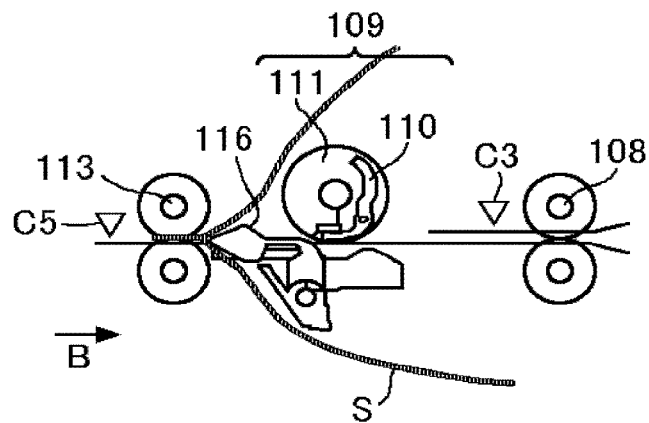
FIG. 9 is a schematic view illustrating the sheet processing device conveying the lamination sheet in reverse with ends of the two sheets separated, subsequent to the state in FIG. 8.

Next, after the separation claws 116 separate the rear end of the lamination sheet S in the entire range, as illustrated in FIG. 9, the controller 500 in the sheet processing device 100 controls the driver to rotate the exit roller pair 113 counter-clockwise in FIG. 9 and convey the lamination sheet S in the reverse conveyance direction (in the direction of arrow B). Then, the separation claws 116 guide the two separated sheets of the lamination sheet S in the upper and lower directions, respectively, and the sheets are fully separated.

Then, the controller 500 in the sheet processing device 100 controls the driver to temporarily stop the conveyance of the lamination sheet S, with the bonded portion of the lamination sheet S gripped (nipped) by the exit roller pair 113. Accordingly, the lamination sheet S has the bonded side as one end and widely opens the other end.

These operations are triggered by detection of the leading end of the lamination sheet S by the sheet sensor C5, and are performed by conveying the specified amount from the sheet sensor C5.

Example of Variation

Figure 10A:
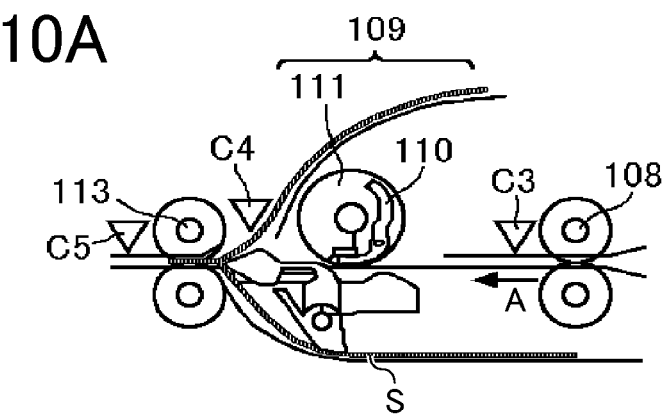
FIG. 10A is a schematic view illustrating guide routes of two sheets of the lamination sheet in the state illustrated in FIG. 9.
Figure 10B:
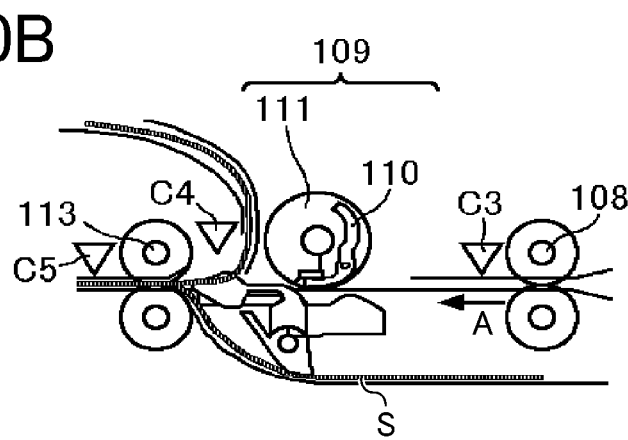
FIGS. 10B and 10C are schematic views illustrating an example of a variation of the guide routes of the two sheets of the lamination sheet.
Figure 10C:
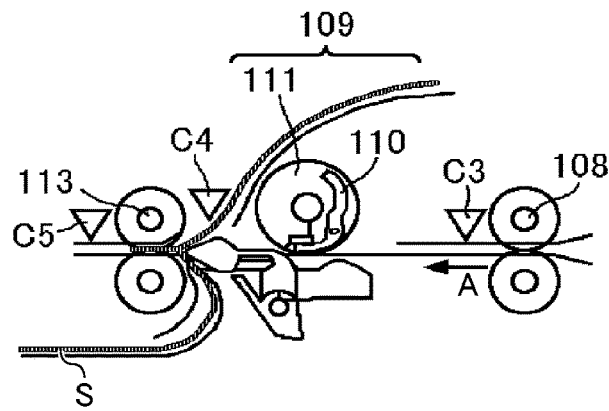

Referring to FIGS. 10A, 10B, and 10C, a description is given of variations of the guide routes of the two separated piles (the upper and lower sheets) of the lamination sheet S. FIG. 10A illustrates the above-described routes (see FIG. 9) for guiding the upper and lower sheets in the same direction from the bonded portion of the lamination sheet S. Alternatively, the upper and lower sheets may be guided in opposite directions. For example, as illustrated in FIG. 10B, the routes may be in an inverted S-shape. Alternatively, as illustrated in FIG. 10C, the routes may be in an S-shape.

A description is provided of an advantageous configuration of the present disclosure.

The sheet processing device 100 of the present embodiment inserts one to a plurality of inner sheets P into the sheet S depending on the size of the lamination sheet S (that is the length of the lamination sheet S in the conveyance direction) and the size of the inner sheet P (that is the length of the inner sheet P in the conveyance direction). Firstly, a single insertion mode is described, and next, a multiple insertion mode is described. In the single insertion mode, the sheet processing device 100 inserts the one inner sheet P into the lamination sheet S. In the multiple insertion mode, the sheet processing device 100 inserts a plurality of inner sheets P into the lamination sheet S along the conveyance direction.

Single Insertion Mode

Figure 11:
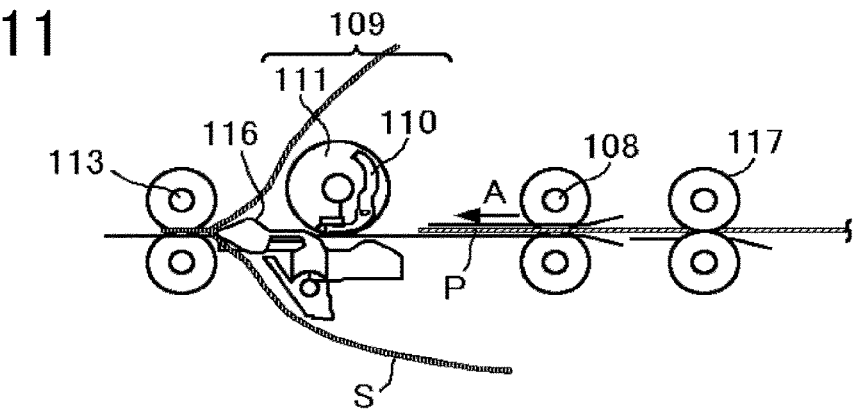
FIG. 11 is a schematic view illustrating the sheet processing device performing a single insertion mode, conveying an inner sheet.

Next, as illustrated in FIG. 11, the sheet processing device 100 rotates the entrance roller pair 108 and directs the inner sheet P conveyed from the sheet tray 103 (see FIG. 1) toward the exit roller pair 113 in the forward conveyance direction (in the direction of arrow A).

Figure 12A:
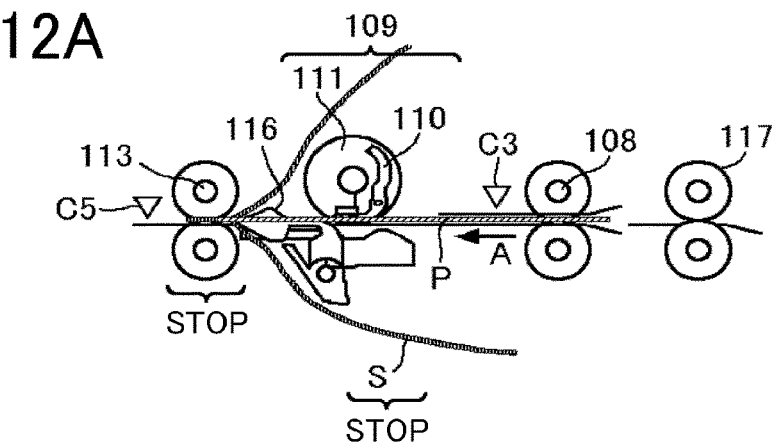
FIGS. 12A and 12B are schematic views illustrating the sheet processing device performing the single insertion mode, inserting the inner sheet into the separated lamination sheet after the state in FIG. 11.

Subsequently, as illustrated in FIG. 12A, when the sheet S and the inner sheet P are merged, the sheet processing device 100 stops the exit roller pair 113 and stops the lamination sheet S. During that time, the inner sheet P is conveyed by the entrance roller pair 108. That is, the inner sheet P is conveyed (inserted) with the lamination sheet S stopped at a specified position. As a result, relative position accuracy of the leading end of the inner sheet P with respect to the leading end of the lamination sheet S can be improved compared with the case where both of the lamination sheet S and the inner sheet P are merged while conveying.

Figure 12B:
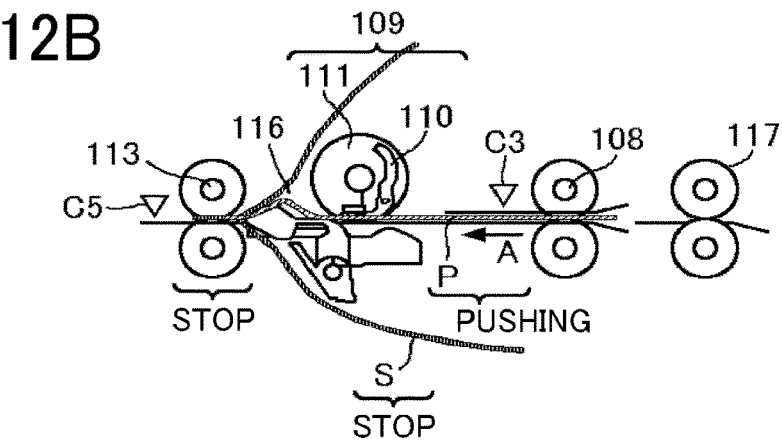

Further, as an alternative method, as illustrated in FIG. 12B, from the state where the inner sheet P joins the stopped lamination sheet S, the inner sheet P is further conveyed by the entrance roller pair 108 and pushed against the lamination sheet S. In this case, the relative position accuracy of the leading end of the inner sheet P with respect to the leading end of the lamination sheet S can be further improved. Furthermore, the inclination of the inner sheet P with respect to the conveying direction can be corrected (tilt correction).

These operations are triggered by detection of the leading end of the inner sheet P by the sheet sensor C3, and are performed by conveying the specified amount (the distance until the inner sheet P joins the sheet S) from the sheet sensor C3.

Figure 13:
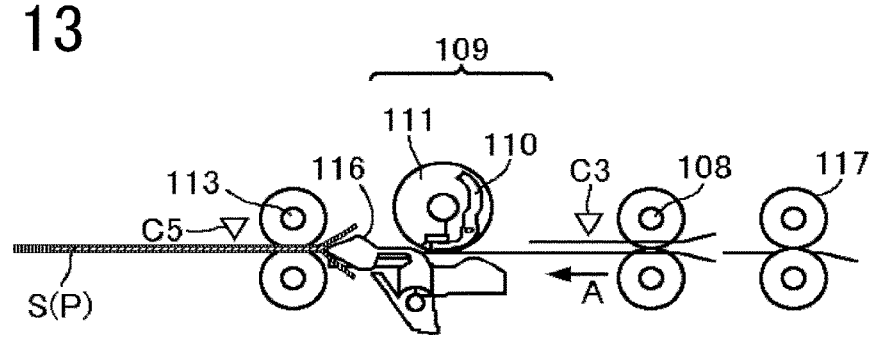
FIG. 13 is a schematic view illustrating the sheet processing device performing the single insertion mode, overlaying the two sheets one on another after the state in FIGS. 12A and 12B.

As illustrated in FIG. 13, the exit roller pair 113 in the sheet processing device 100 conveys the lamination sheet S, with the inner sheet P inserted therein, in the forward conveyance direction (in the direction of arrow A), thereby stacking the two sheets one on another again and closing the opening. A roller disposed downstream from the exit roller pair 113 ejects and loads the lamination sheet S sandwiching the inner sheet P onto the output tray 104 (see FIG. 1).

Next, the multiple insertion mode is described. In the multiple insertion mode, a plurality of inner sheets P (two sheets in the following embodiments) are arranged and inserted in the conveyance direction.

Multiple Insertion Mode

Figure 14:
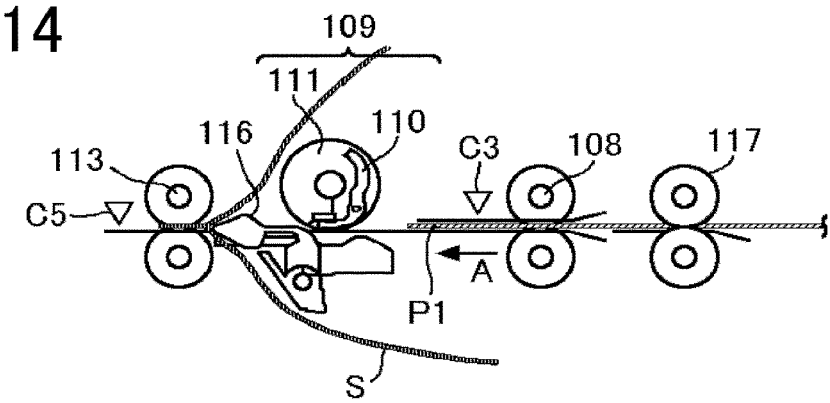
FIG. 14 is a schematic view illustrating the sheet processing device performing a multiple insertion mode, conveying a first inner sheet.

As illustrated in FIG. 14, the controller 500 in the sheet processing device 100 controls the driver to rotate the entrance roller pair 108 and convey the first inner sheet (hereinafter referred to as a first inner sheet P1) from the sheet tray 103 (see FIG. 1) to the exit roller pair 113 in the forward conveyance direction (in the direction of arrow A).

Figure 15A:
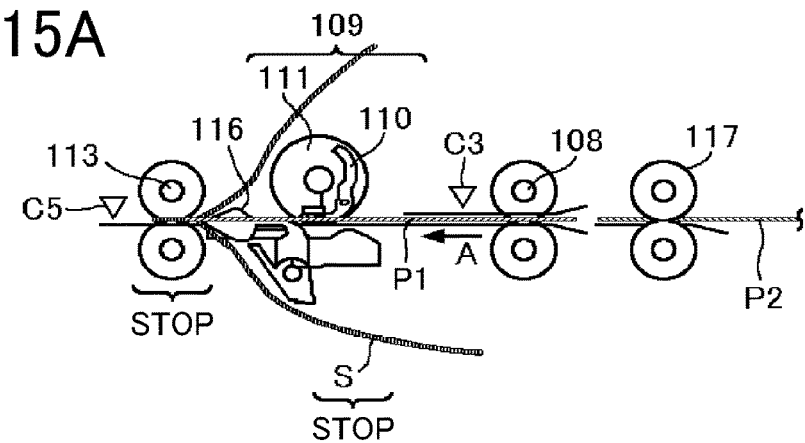
FIGS. 15A and 15B are schematic views illustrating the sheet processing device performing the multiple insertion mode, inserting the first inner sheet into the lamination sheet and conveying a second inner sheet after the state in FIG. 14.

Subsequently, as illustrated in FIG. 15A, when the lamination sheet S and the first inner sheet P1 are merged, the sheet processing device 100 stops the exit roller pair 113 and stops the lamination sheet S. During that time, the first inner sheet P is conveyed by the entrance roller pair 108. That is, the first inner sheet P1 is conveyed (inserted) with the lamination sheet S stopped at a specified position. As a result, relative position accuracy of the leading end of the first inner sheet P1 with respect to the leading end of the lamination sheet S can be improved compared with the case where both of the lamination sheet S and the first inner sheet P1 are merged while conveying.

Figure 15B:
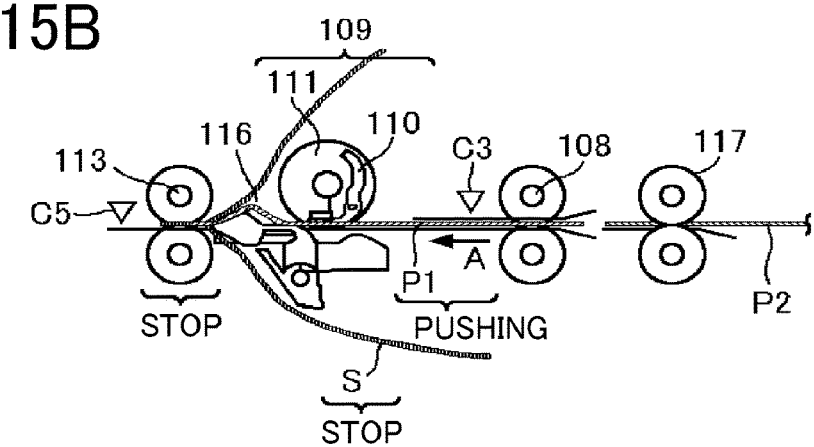

Further, as an alternative method, as illustrated in FIG. 15B, from the state where the first inner sheet P1 joins the stopped lamination sheet S, the first inner sheet P1 is further conveyed by the entrance roller pair 108 and pushed against the lamination sheet S. In this case, the relative position accuracy of the leading end of the first inner sheet P1 with respect to the leading end of the lamination sheet S can be further improved. Furthermore, the inclination of the first inner sheet P1 with respect to the conveying direction can be corrected (tilt correction).

These operations are triggered by detection of the leading end of the first inner sheet P1 by the sheet sensor C3, and are performed by conveying the designated amount (the distance until the first inner sheet P1 joins the sheet S) from the sheet sensor C3.

The controller 500 in the sheet processing device 100 controls the driver to rotate the pickup roller 106 and convey the second inner sheet (hereinafter referred to as a second inner sheet P2) from the sheet tray 103 (see FIG. 1) to the exit roller pair 113 in the forward conveyance direction (in the direction of arrow A).

Figure 16A:
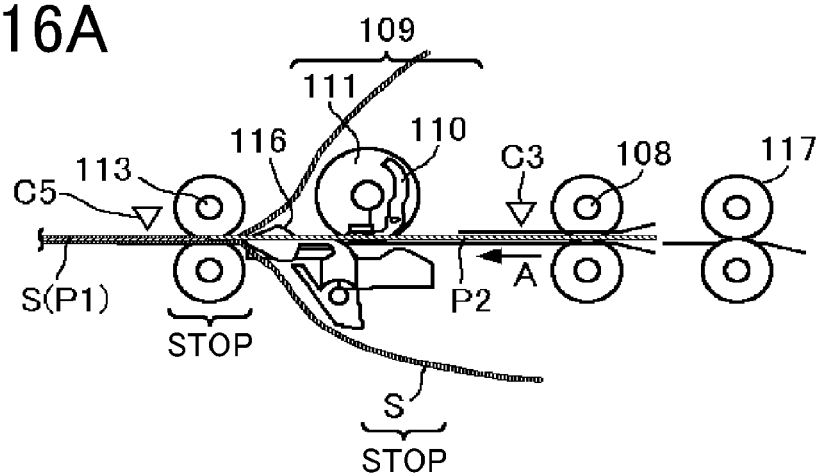
FIGS. 16A and 16B are schematic views illustrating the sheet processing device performing the multiple insertion mode, inserting the second inner sheet into the lamination sheet after the state in FIGS. 15A and 15B.

Subsequently, as illustrated in FIG. 16A, the controller 500 in the sheet processing device 100 controls the driver to rotate the entrance roller pair 108 so that the lamination sheet S and the second inner sheet P2 converge, and insert the second inner sheet P2 into the opened lamination sheet S.

When the lamination sheet S and the second inner sheet P2 join and the second and subsequent inner sheets join, the controller 500 in the sheet processing device 100 stops the exit roller pair 113 and stops the sheet S thereafter. During that time, the subsequent inner sheets are conveyed by the entrance roller pair 108. In this case, the relative position accuracy of the leading end of the subsequent inner sheets with respect to the leading end of the lamination sheet S can be further improved.

Figure 16B:
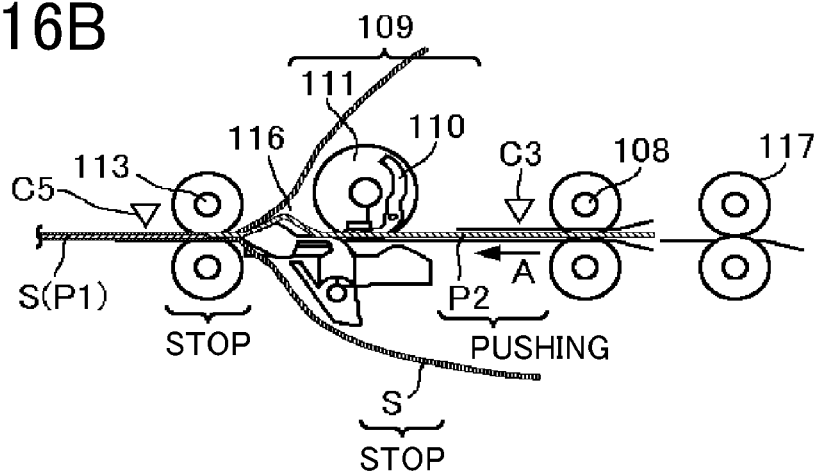

As an alternative method, as illustrated in FIG. 16B, from the state where the inner sheet P joins the stopped sheet S, the subsequent inner sheets can be conveyed by the entrance roller pair 108 and can push the lamination sheet S. In this case, the relative position accuracy of the leading end of the inner sheet P with respect to the leading end of the lamination sheet S can be further improved. Furthermore, the inclination of the subsequent inner sheets with respect to the conveying direction can be corrected (tilt correction).

These operations are triggered by detection of the leading end of the inner sheet P by the sheet sensor C3, and are performed by conveying the specified amount (the distance until the inner sheet P joins the sheet S) from the sheet sensor C3.

Figure 17:
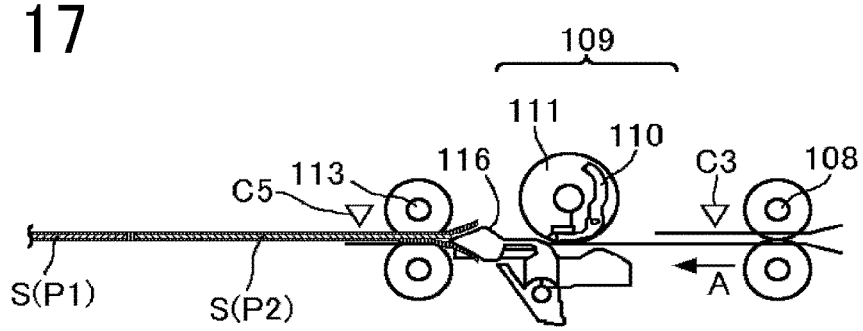
FIG. 17 is a schematic view illustrating the sheet processing device performing the multiple insertion mode, overlaying the two sheets one on another after the state in FIGS. 16A and 16B.

As illustrated in FIG. 17, the sheet processing device 100 conveys the lamination sheet S into which the first inner sheet P1 and the second inner sheet P2 are inserted by the exit roller pair 113 in the forward conveying direction (in the direction indicated by arrow A), so that the two sheets of the lamination sheet S are stacked again and the opening is closed.

Figure 18:
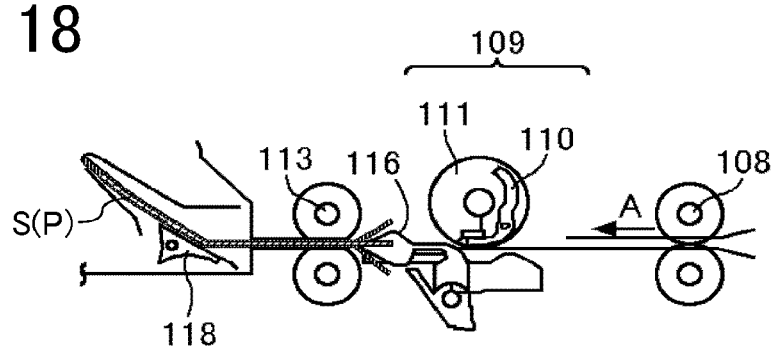
FIG. 18 is a schematic view of an example of a main part of the sheet processing device including a bifurcating claw.

When the sheet processing device 100 includes a heat pressurizing device capable of heating and pressurizing the lamination sheet S, as illustrated in FIG. 18, the lamination sheet S may be conveyed to the heating and pressure device by switching the route with the bifurcating claw 118. Not only in the multiple insertion mode but also in the single insertion mode, the route may be switched with the bifurcating claw 118 similarly.

As described above, the controller 500 in the sheet processing device 100 according to the present embodiment can control the driver and other parts to perform insertion processing to insert the inner sheet P into the lamination sheet S.

Next, a configuration is described in which the sheet processing device 100 acquires the size (length in the conveyance direction) of the lamination sheet S and the inner sheet P and the number of the inner sheet P to be inserted.

As illustrated in FIG. 1, the sheet processing device 100 in the present embodiment includes a sheet size sensor C6 which is a sheet size detector and a sheet size sensor C7 which is a medium size detector. Based on the detection results of these sensors, if the length of the inner sheet P in the conveyance direction is equal to a threshold value or less, the sheet processing device 100 automatically switches to the multiple insertion mode and performs the insertion process. On the other hand, when the length of the inner sheet P in the conveyance direction is equal to the threshold value or more, the sheet processing device 100 automatically switches to the single insertion mode and performs the insertion process.

In particular, when the length of the inner sheet P in the conveyance direction is half of the length of the lamination sheet S in the conveyance direction or less, the insertion process may be performed by automatically switching to the plurality of insertion modes. In the case of multiple insertion mode, the number of sheets of the inner sheet P to be inserted into the lamination sheet S is calculated from the quotient of the size of the lamination sheet S and the size of the inner sheet P.

The sheet sensors C1 and C2 may be used instead of or in addition to the sheet size sensors C6 and C7.

As described above, the controller 500 in the sheet processing device 100 according to the present embodiment can automatically control the insertion processing according to the sizes of the lamination sheet S and the inner sheet P.

Figure 24A:
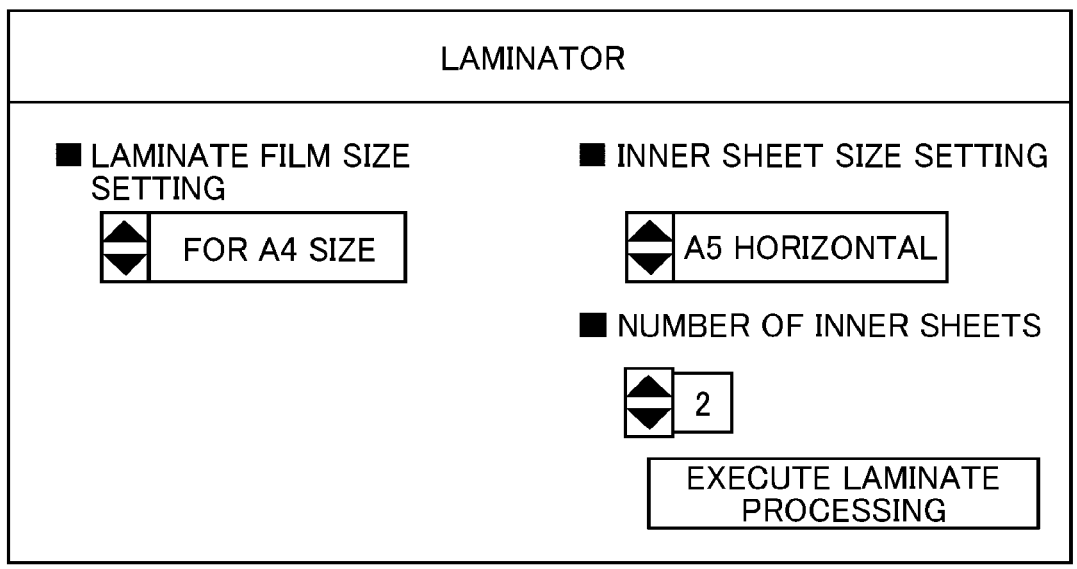
FIGS. 24A and 24B are diagrams illustrating examples of an operation screen to set a lamination sheet size, an inner sheet size, and number of the lamination sheets that are displayed on an operation panel of the sheet processing device illustrated in FIG. 1.
Figure 24B:
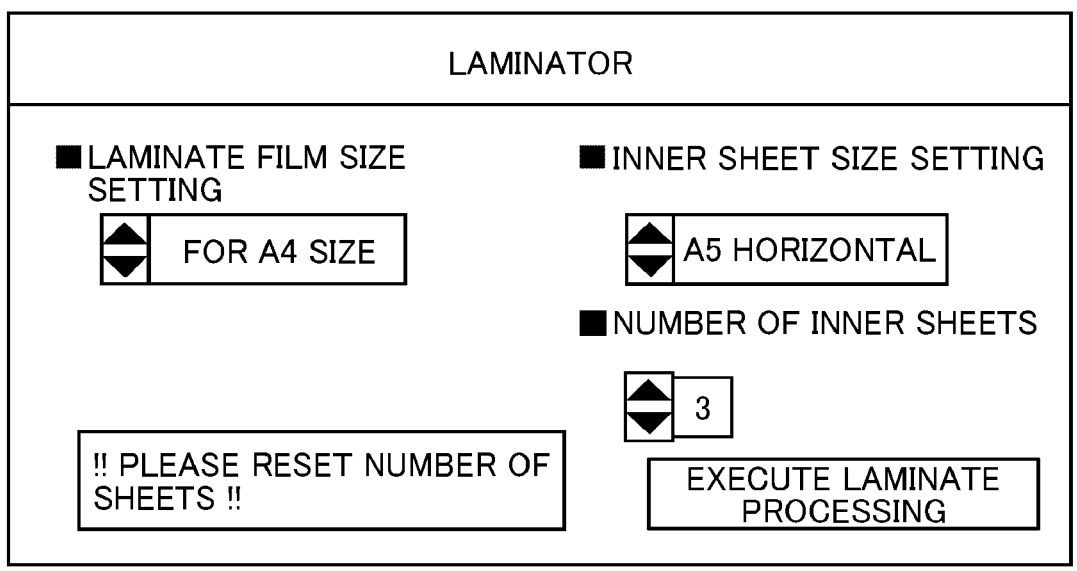

Next, a configuration in which user can select the insertion process is described. FIGS. 24A and 24B are views illustrating examples of an operation screen to set the size of the lamination sheet S and the inner sheet P, and the number of the inner sheet P to be inserted, that are displayed on an operation panel 10 of the sheet processing device 100 illustrated in FIG. 1.

As illustrated in FIG. 24A, the sheet processing device 100 according to the present embodiment accepts selecting and inputting the size of the lamination film (lamination sheet S), the size of the inner sheet P, and the number of the inner sheets P to be inserted, which are performed by the user by touching the screen on the operation panel 10.

However, when the sum of the lengths of the inner sheets P in the conveyance direction is equal to or larger than the length of the lamination sheet S in the conveyance direction, the controller 500 in the sheet processing device 100 determines that the input data are wrong. As illustrated in FIG. 24 B, the controller 500 in the sheet processing device 100 controls the operation panel 10 to display an error message and prompt the user to select and input the sizes or the number described above again.

More specifically, as size conditions, when $L1 \geq L2 \times n$ is satisfied, where the length of the lamination sheet S in the conveyance direction is L1, the length of the inner sheet P in the conveyance direction is L2, and the number of inner sheets P inserted between the lamination sheet S is n, the operation panel 10 accepts input of user. Then, the controller 500 in the sheet processing device 100 performs the process of inserting the inner sheets P into the lamination sheet S.

On the other hand, when $L1 < L2 \times n$ is satisfied, the controller 500 in the sheet processing device 100 controls the operation panel 10 to notify the user a message, that is, display the error message and prompt the user to select and input the sizes or the number again.

In this way, the user can select either the single insertion mode to insert the one inner sheet P into the lamination sheet S or the multiple insertion mode to insert the multiple inner sheets P into the lamination sheet S on the operation panel 10.

The controller 500 in the sheet processing device 100 may automatically perform the insertion processing based on the above described size conditions.

As described above, the controller 500 in the sheet processing device 100 according to the present embodiment controls the driver and other parts to perform the insertion processing to insert the inner sheets P into the lamination sheet S based on the length of the lamination sheet S in the conveyance direction, the lengths of the inner sheets P in the conveyance direction, and the number of the inner sheets P. As a result, the sheet processing device 100 can automatically and suitably insert one or a plurality of inner sheets P into the lamination sheet S.

In addition, since the configuration of the sheet processing device 100 is simpler than a laminator using a vacuum device, the entire sheet processing device 100 can be simple and compact.

Further, in the present embodiment, as illustrated in FIG. 1, the sheet processing device 100 can load the lamination sheets S and the inner sheets P on separate trays and can convey separately. Accordingly, it is not necessary to load the lamination sheets S and the inner sheets P in a predetermined order, for added convenience. In the present embodiment, the lamination sheets S are loaded on the sheet tray 102, and the inner sheets P are loaded on the sheet tray 103. However, where to load the lamination sheets S and the inner sheets P are not limited thereto. Alternatively, the inner sheet P can be loaded on the sheet tray 102 and the lamination sheet S can be loaded on the sheet tray 103.

Next, descriptions are given of a laminator, an image forming apparatus, and an image forming system including the sheet processing device according to any of embodiments of the present disclosure.

Figure 25:
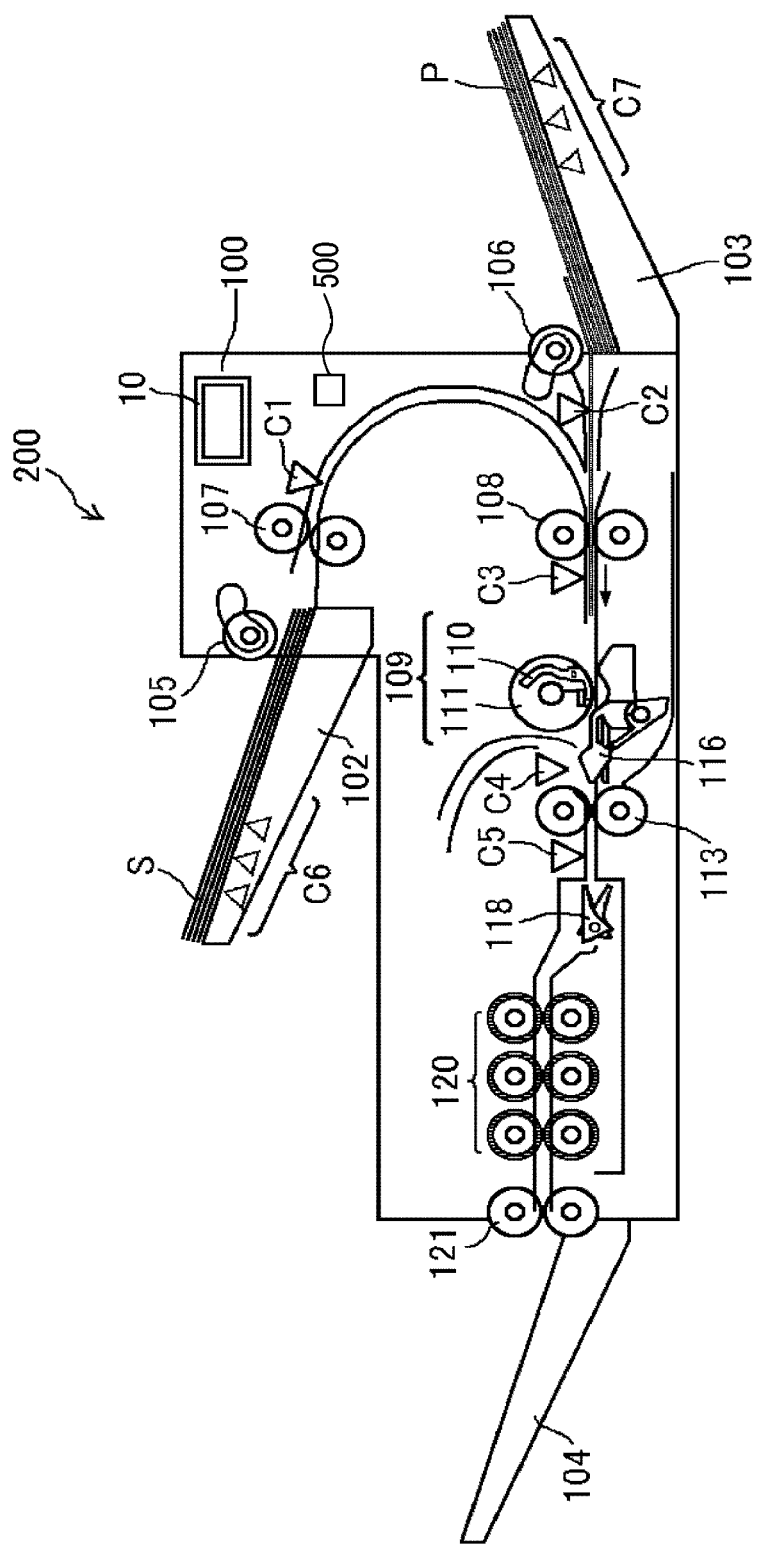
FIG. 25 is a schematic view illustrating an overall configuration of a laminator according to one embodiment of the present disclosure, including the sheet processing device illustrated in FIG. 1.

FIG. 25 is a view illustrating an example of a general arrangement of the laminator including the sheet processing device according to one embodiment of the present disclosure. As illustrated in FIG. 25, a laminator 200 includes the sheet processing device 100 described above, the bifurcating claw 118 to switch the conveyance route of the lamination sheet S, heat and pressure rollers 120 as a heat and pressure rotator to heat and press the lamination sheet S, and an ejection roller 121 disposed downstream from the heat and pressure rollers 120.

The laminator 200 can perform a series of operations from feeding and separation of the lamination sheet S, insertion of the inner sheet P, and lamination with heat and pressure on a stand-alone basis. This series of operations can be performed automatically without human intervention, and convenience can be improved.

Figure 26:
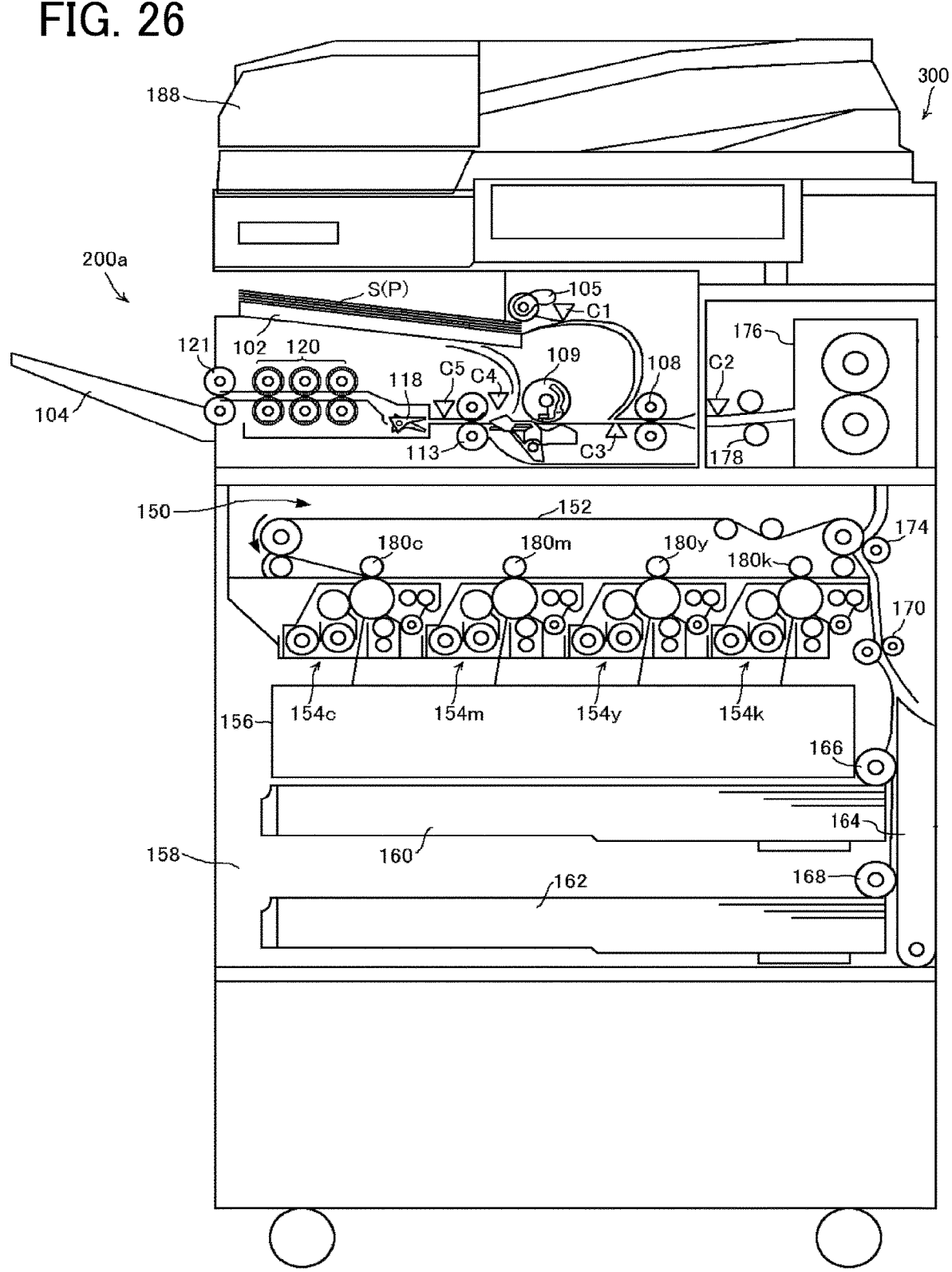
FIG. 26 is a schematic view illustrating an overall configuration of an image forming apparatus according to one embodiment of the present disclosure, including the laminator illustrated in FIG. 25.

FIG. 26 is a view illustrating an example of a general arrangement of an image forming apparatus including the laminator according to one embodiment of the present disclosure. An image forming apparatus 300 includes a laminator 200a inside to perform a laminating process.

The laminator 200a includes the sheet tray 102 on which lamination sheets S or inner sheets P are loaded. Additionally, the laminator 200a can receive at least one of the lamination sheets S and the inner sheets P fed from the image forming apparatus 300. Therefore, an image can be added in-line on the lamination sheet S or the inner sheet P by the image forming apparatus 300 (for example, a printer or a copier).

The configuration of the image forming apparatus 300 is described in detail. As illustrated in FIG. 26, an intermediate transfer device 150 is disposed in the main body of the image forming apparatus 300. The intermediate transfer device 150 includes an endless intermediate transfer belt 152 wound around a plurality of rollers and stretched almost horizontally. The intermediate transfer belt 152 rotates counterclockwise in FIG. 26.

Below the intermediate transfer device 150, image forming devices 154c, 154m, 154y, and 154k for yellow (Y), magenta (M), cyan (C), and black (K) are arranged respectively, in a quadruple tandem manner along an extended direction of the intermediate transfer belt 152. Each of the image forming devices 154c, 154m, 154y, and 154k includes a drum-shaped image bearer that rotates clockwise in FIG. 26. Around the image bearer, a charger, a developing device, a transfer device, a cleaning device, and so forth, are disposed. Below each image forming device 154, an exposure device 156 is disposed.

Below the exposure device 156, a sheet feeder 158 is disposed. The sheet feeder 158 includes a first sheet tray 160 that stores lamination sheets S and a second sheet tray 162 that stores inner sheets P. The first sheet tray 160 is an example of a third loader on which two-ply sheets are loaded, and the second sheet tray 162 is an example of a fourth loader on which sheet-shaped media (inner sheets) are loaded.

A first sheet feeding roller 166 is disposed at the upper right of the first sheet tray 160 and feeds the lamination sheets S from the first sheet tray 160 one by one to a sheet conveyance path 164. A second sheet feeding roller 168 is disposed at the upper right of the second sheet tray 162 and feeds the inner sheets P from the second sheet tray 162 one by one to the sheet conveyance path 164.

The sheet conveyance path 164 extends from the lower side to the upper side on the right side in the main body of the image forming apparatus 300 and communicates with the laminator 200a inside the image forming apparatus 300. The sheet conveyance path 164 is provided with a conveying roller 170, a secondary transfer device 174 disposed opposite the intermediate transfer belt 152, a fixing device 176, a sheet ejection device 178 including an output roller pair, and so forth in order.

The first sheet feeding roller 166, the conveying roller 170, and the sheet conveyance path 164 are examples of a third feeder to feed the two-ply sheet from the first sheet tray 160 (the third loader). The second sheet feeding roller 168, the conveying roller 170, and the sheet conveyance path 164 are examples of a fourth feeder to feed the sheet medium from the second sheet tray 162 (the fourth loader). The intermediate transfer device 150, the fixing device 176, and the like are examples of an image forming device that forms an image on a two-ply sheet or a sheet medium.

Next, a description is given of operations of the image forming apparatus 300 to form an image on the lamination sheet S and then perform lamination according to the present embodiment.

To form an image on the lamination sheet S, first, an image reading device (scanner) 188 reads a document image, and the exposure device 156 optically writes image data onto the image bearer. Next, the image forming devices 154c, 154m, 154y, and 154k form respective color toner images on the image bearers thereof. Then, primary transfer devices 180c, 180m, 180y, and 180k sequentially transfer the toner images onto the intermediate transfer belt 152, thereby forming a color image formed thereon.

By contrast, the image forming apparatus 300 rotates the first sheet feeding roller 166 to feed the lamination sheet S to the sheet conveyance path 164. Then, the lamination sheet S is conveyed by the conveying roller 170 through the sheet conveyance path 164 and sent to a secondary transfer position, timed to coincide with the color image on the intermediate transfer belt 152. Then, the secondary transfer device 174 transfers the color image formed on the intermediate transfer belt 152 onto the lamination sheet S as described above.

After the image transfer, the fixing device 176 fixes the image on the lamination sheet S, and the sheet ejection device 178 sends the lamination sheet S to the laminator 200a.

Further, the image forming apparatus 300 rotates the second sheet feeding roller 168 to feed the inner sheet P to the sheet conveyance path 164, and the sheet ejection device 178 sends the inner sheet P to the laminator 200a.

In this way, the lamination sheet S on which the image has formed and the inner sheet P are sent to the laminator 200a, and the laminating process is performed. The details of the laminating process are described above and redundant descriptions are omitted.

With the above-described configurations, the image forming apparatus 300 according to the present embodiment can perform the laminating process with the laminator 200a after image formation on the inner sheet P. In addition, the image forming apparatus 300 can perform the laminating process after image formation on both the inner sheet P and the lamination sheet S.

Next, a variation of the image forming apparatus including the sheet processing device and the image forming system according to the present disclosure.

Figure 27:
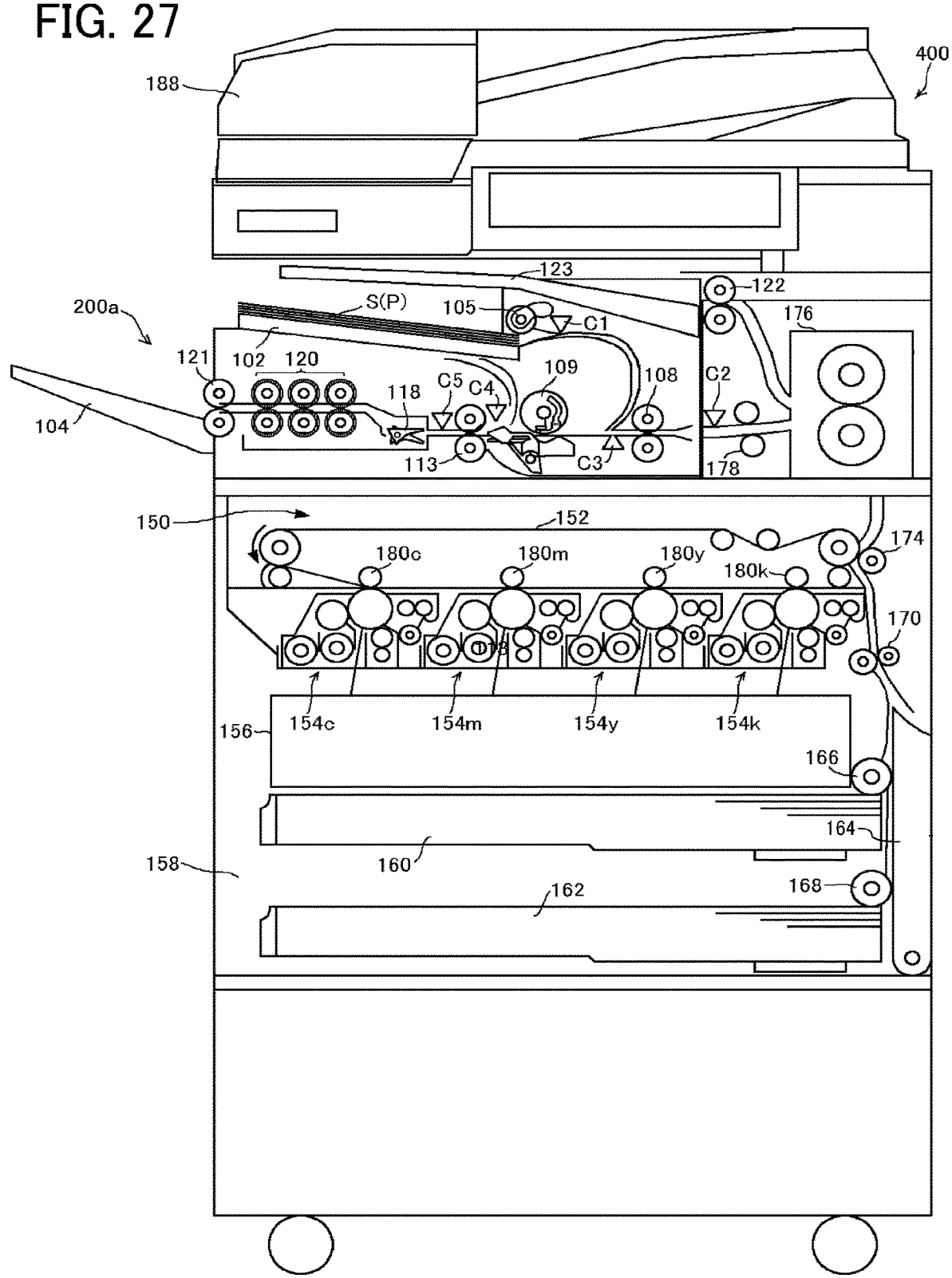
FIG. 27 is a schematic view illustrating an overall configuration of the image forming apparatus according to a variant embodiment of the present disclosure, including the laminator illustrated in FIG. 25.

FIG. 27 is a view illustrating the variation of a general arrangement of the image forming apparatus including the laminator. Differently from the image forming apparatus 300 illustrated in FIG. 20, a main body of an image forming apparatus 400 includes an ejection roller pair 122 and an output tray 123 of the main body.

When the laminating process is not performed, the image forming apparatus 400 can eject the recording medium on which the image is formed using the ejection roller pair 122 of the main body to the output tray 123 of the main body. Therefore, the image forming apparatus 400 does not slow the output speed of an image formation when the laminating process is not performed.

The laminator 200a can be removably installed in the image forming apparatus 400. That is, when the laminating process is unnecessary, the laminator 200a can be removed from the image forming apparatus 400.

In addition, in the laminator 200a thus removed, the sheet tray 103 on which the inner sheets P are loaded and the pickup roller 106 to feed the inner sheets P from the sheet tray 103 can be mounted, so that the laminator 200a is used as a stand-alone laminating unit similar to that illustrated in FIG. 25.

The image forming apparatus 300 illustrated in FIG. 26 and the image forming apparatus 400 illustrated in FIG. 27 can include a sheet processing device 100 instead of the laminating unit. The image forming apparatus 400 illustrated in FIG. 27 can include a sheet processing device 100 that is removably attached thereto.

Further, aspects of this disclosure can be embodied as an image forming system that includes an image forming apparatus and the sheet processing device 100 or the laminator 200 detachably coupled to the image forming apparatus. Furthermore, aspects of this disclosure can be embodied as a system including at least one of a sheet feeder (a loader) and a case binding device or the like. Note that, in the case where the lamination sheet S is passed through the fixing device 176, the lamination sheet S is not bonded at the fixing temperature, but is bonded by application of heat higher than the fixing temperature.

Although the image forming apparatuses 300 and 400 employ electrophotography for image formation on the lamination sheet S and the inner sheet described above, the image formation method is not limited thereto, and inkjet, stencil printing, or other printing method can be used.

Figure 28A:
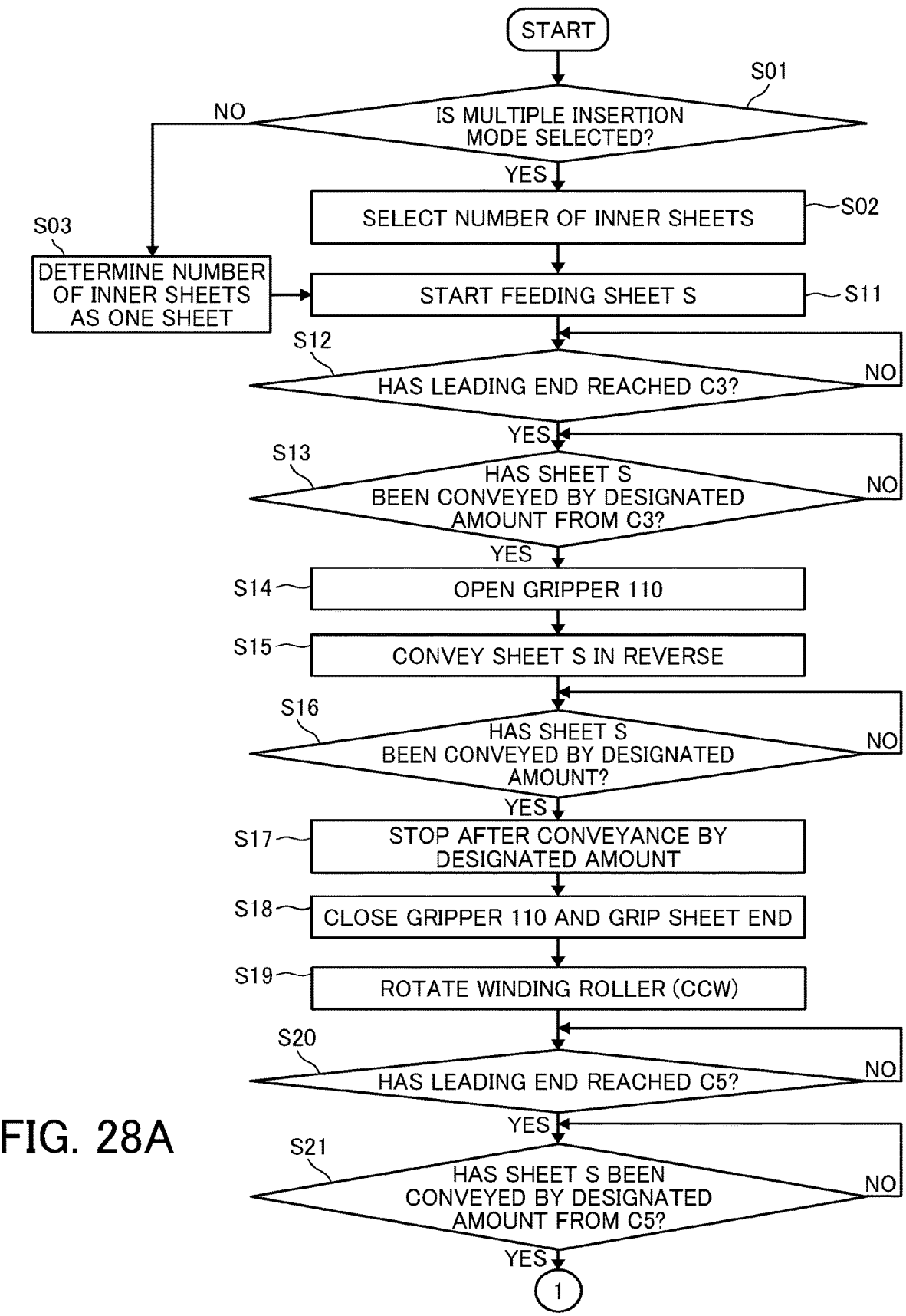
Figure 28C:
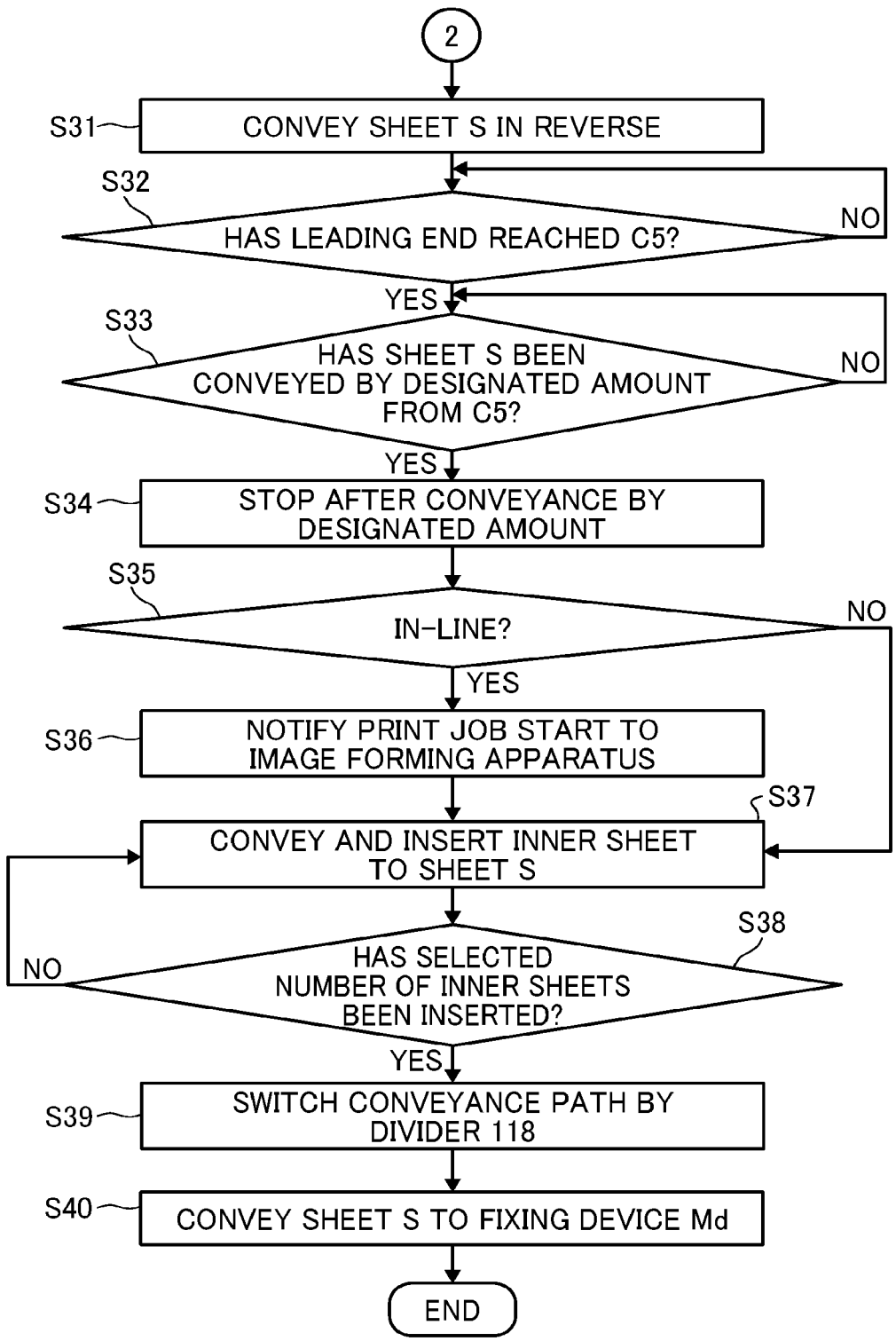

FIG. 28 configured by FIGS. 28A, 28B, and 28C is a flowchart illustrating a series of processes from the sheet feeding to the insertion of the inner sheet and completion of the laminating process. The description below proceeds while indicating the reference numerals indicated in the flowchart.

First, in step S01, the controller 500 in the sheet processing device 100 determines whether the user has selected the multiple insertion mode. When the user selects the multiple insertion mode, the controller 500 requests the user inputting the number of inner sheets in step S02.

That is, the controller 500 controls the operation panel 10 to display the operation screen as illustrated in FIG. 24A and request the user setting the lamination film size, the inner sheet size, and the number of the inner sheets to be sandwiched.

On the other hand, when the controller 500 determines that the user does not select the multiple insertion mode, the controller 500 in the sheet processing device 100 performs step S03, that is, determines that the user select the single insertion mode.

Next, in step S11, the controller 500 in the sheet processing device 100 controls the driver to start feeding the lamination sheet S (see FIG. 1). In step S12, the controller 500 determines whether the leading end of the lamination sheet S reached the sheet sensor C3 based on outputs from the sheet sensor C3 (see FIG. 2). In step S13, the controller 500 determines whether the lamination sheet S is conveyed by the designated amount from the sheet sensor C3, that is, whether a designated time passed since the sheet sensor C3 detects the end of the lamination sheet S. In response to a determination that the lamination sheet S is conveyed by the designated amount from the sheet sensor C3 ("Yes" in step S13), the controller 500 in the sheet processing device 100 controls the driver to temporarily stop the sheet conveyance (see FIG. 3). For example, the "designated amount" used here and those in subsequent processes are stored in a memory by a manufacturer based on empirical data. Subsequently, the controller 500 controls the driver to open the gripper 110 in step S14 and convey the lamination sheet S in the reverse conveyance direction in step S15 (see FIG. 4).

In step S16, the controller 500 in the sheet processing device 100 determines whether the lamination sheet S is conveyed by a designated amount. In response to a determination that the lamination sheet S is conveyed by the designated amount ("Yes" in step S16), the controller 500 controls the driver to temporarily stop the sheet conveyance in step S17. In step S18, the controller 500 controls the driver to close the gripper 110 to grip the sheet end of the lamination sheet S (see FIG. 5).

In step S19, the controller 500 in the sheet processing device 100 controls the driver to rotate the winding roller 109 counterclockwise (in reverse) and wind the lamination sheet S around the winding roller 109 (see FIG. 6). In step S20, the controller 500 determines whether the leading end of the lamination sheet S reached the sheet sensor C5. In step S21, the controller 500 in the sheet processing device 100 determines whether the lamination sheet S is conveyed by the designated amount from the sheet sensor C5. In response to a determination that the lamination sheet S is conveyed by the designated amount from the sheet sensor C5 ("Yes" in step S21), the controller 500 determines whether the state of the lamination sheet S is normal using detection results of the abnormality detector C4 in step S22.

The abnormality detector C4 detects the size of the gap between the two sheets of the lamination sheet S for the sheet processing device 100 to determine whether or not the size of the gap exceeds a threshold. In step S23, the controller 500 in the sheet processing device 100 determines whether the state of the lamination sheet S is normal, that is, whether the size of the gap is equal to or greater than the threshold based on the detection result of the abnormality detector C4. In response to a determination that the state of the lamination sheet S is normal, the controller 500 proceeds to step S24a.

On the other hand, in response to a determination in step S23 that the state of the lamination sheet S is abnormal (the size of the gap is smaller than the threshold), the controller 500 in the sheet processing device 100 controls the operation panel 10 to display the abnormality (e.g., displays an error message) and stops the sheet processing (a job) in step S24b.

In step S24a, the controller 500 in the sheet processing device 100 controls the driver to insert, from both sides, the separation claws 116 into the gap generated between the sheets of the lamination sheet S (see FIG. 7). In step S25, the controller 500 in the sheet processing device 100 controls the driver to rotate the winding roller 109 clockwise (forward direction) with the separation claws 116 inserted from both sides of the lamination sheet S, and convey the lamination sheet S in the forward conveyance direction.

In step S26, the controller 500 determines whether the leading end of the lamination sheet S reached the sheet sensor C5. In response to a determination that the lamination sheet S has been conveyed by the designated amount from the sheet sensor C5 ("Yes" in S27), the controller 500 in the sheet processing device 100 controls the driver to open the gripper 110 in step S28.

In step S29, the controller 500 in the sheet processing device 100 controls the driver to temporarily stop the conveyance of the lamination sheet S and, in step S30, move the separation claws 116 further in the sheet width direction (see FIG. 8). As a result, the rear end portion of the lamination sheet S in the forward conveyance direction is separated into the upper and lower sheets.

In step S31, the controller 500 in the sheet processing device 100 controls the driver to convey the lamination sheet S in the reverse conveyance direction. In step S32, the controller 500 determines whether the leading end of the lamination sheet S in the forward conveyance direction has reached the sheet sensor C5. In step S33, the controller 500 in the sheet processing device 100 determines whether the lamination sheet S is conveyed by the designated amount after the sheet sensor C5 detects the leading end of the lamination sheet S. In response to a determination that the lamination sheet S is conveyed by the designated amount from the sheet sensor C5 ("Yes" in step S33), the controller 500 suspends the sheet conveyance in step S34 (see FIG. 9). As a result, the separation of the lamination sheet S is completed.

Subsequently, in step S35, the controller 500 in the sheet processing device 100 determines whether or not to perform image formation (with an in-line image forming apparatus) on the inner sheet P to be inserted into the lamination sheet S. In the case of in-line image formation ("Yes" in step S35), the controller 500 in the sheet processing device 100 sends a signal to the in-line image forming apparatus to start a print job to form images on the inner sheet P in step S36. Then, the controller 500 proceeds to step S37.

On the other hand, when in-line image formation is not performed ("No" in step S35), the controller 500 proceeds to step S37.

In step S37, the controller 500 in the sheet processing device 100 controls the driver to convey the inner sheet P in the forward conveyance direction to be inserted in the opening of the lamination sheet S. In step S37, when the controller 500 performs the single insertion mode, the sheet processing device 100 performs operations as illustrated in FIGS. 11 to 13, and when the controller 500 performs the multiple insertion mode, the sheet processing device 100 performs operations as illustrated in FIGS. 14 to 17.

In step S38, the controller 500 in the sheet processing device 100 determines whether the selected number of inner sheets P are inserted into the lamination sheet S. After the inner sheets P are inserted, the controller 500 proceeds to step S39.

In step S39, the controller 500 controls the driver to rotate the bifurcating claw 118 to switch the conveyance route. In step S40, the lamination sheet S sandwiching the inner sheet P is conveyed to the heat and pressure device (fixing device Md), and heated and pressed to complete the lamination process (see FIG. 18).

In the case of in-line image formation ("Yes" in step S35), the controller 500 sends the image forming apparatus the signal to start the print job after the sheet processing device 100 completes separating the lamination sheet S, and the image forming apparatus prints images on the inner sheet P and conveys the inner sheet P to the sheet processing device 100. In this case, the sheet processing device 100 waits until the printed inner sheet P is conveyed and reaches the sheet sensor C1. The controller 500 may send the image forming apparatus the signal to start the print job in advance based on a time to convey the printed inner sheet P, for example, after the separation claws 116 completes operations illustrated in FIG. 7. Thus, the productivity of jobs can be improved.

Figure 29A:
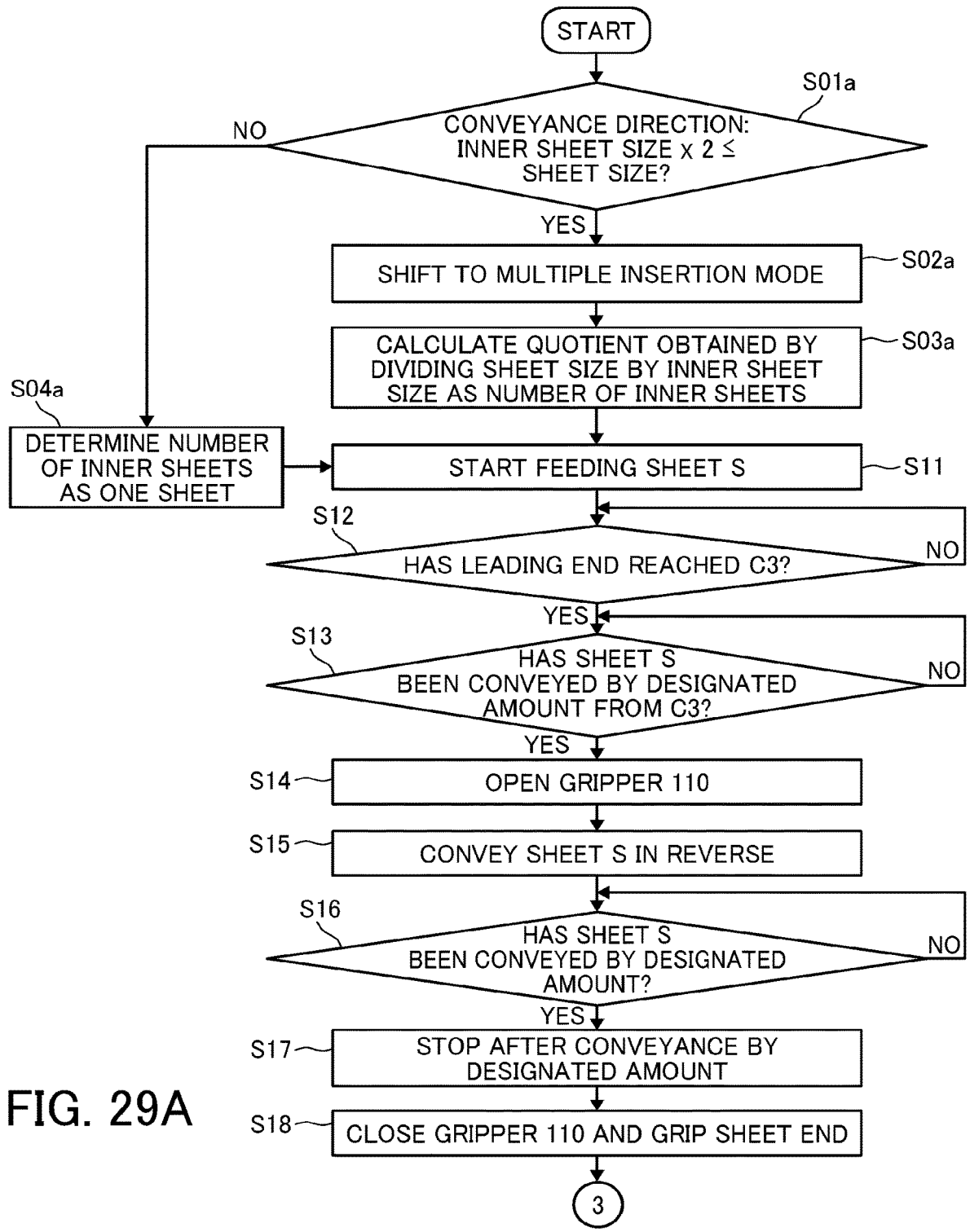
FIGS. 29A to 29C are flowcharts illustrating a series of processes from sheet feeding to insertion of the inner sheet and completion of the laminating process.
Figure 29B:
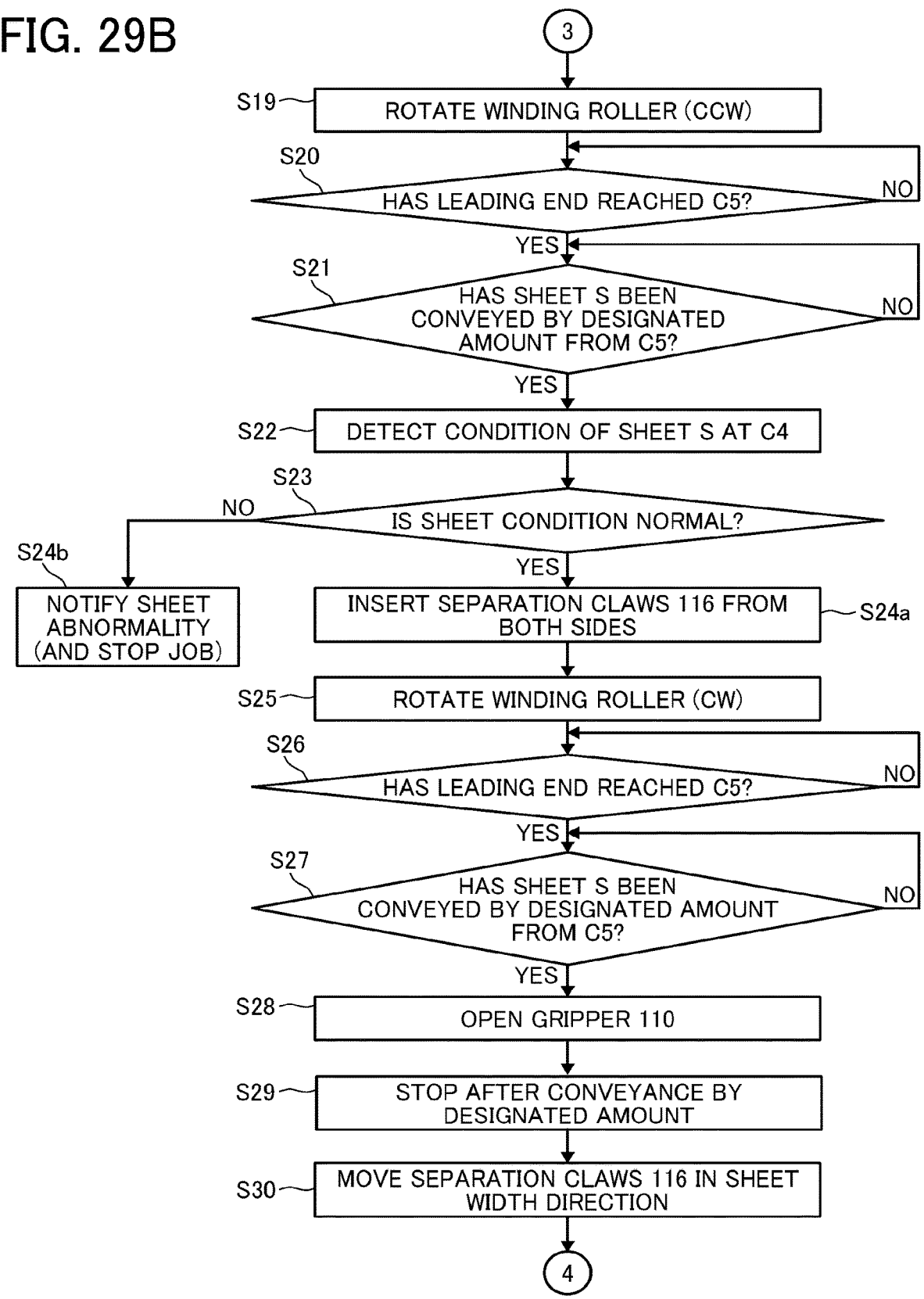
Figure 29C:
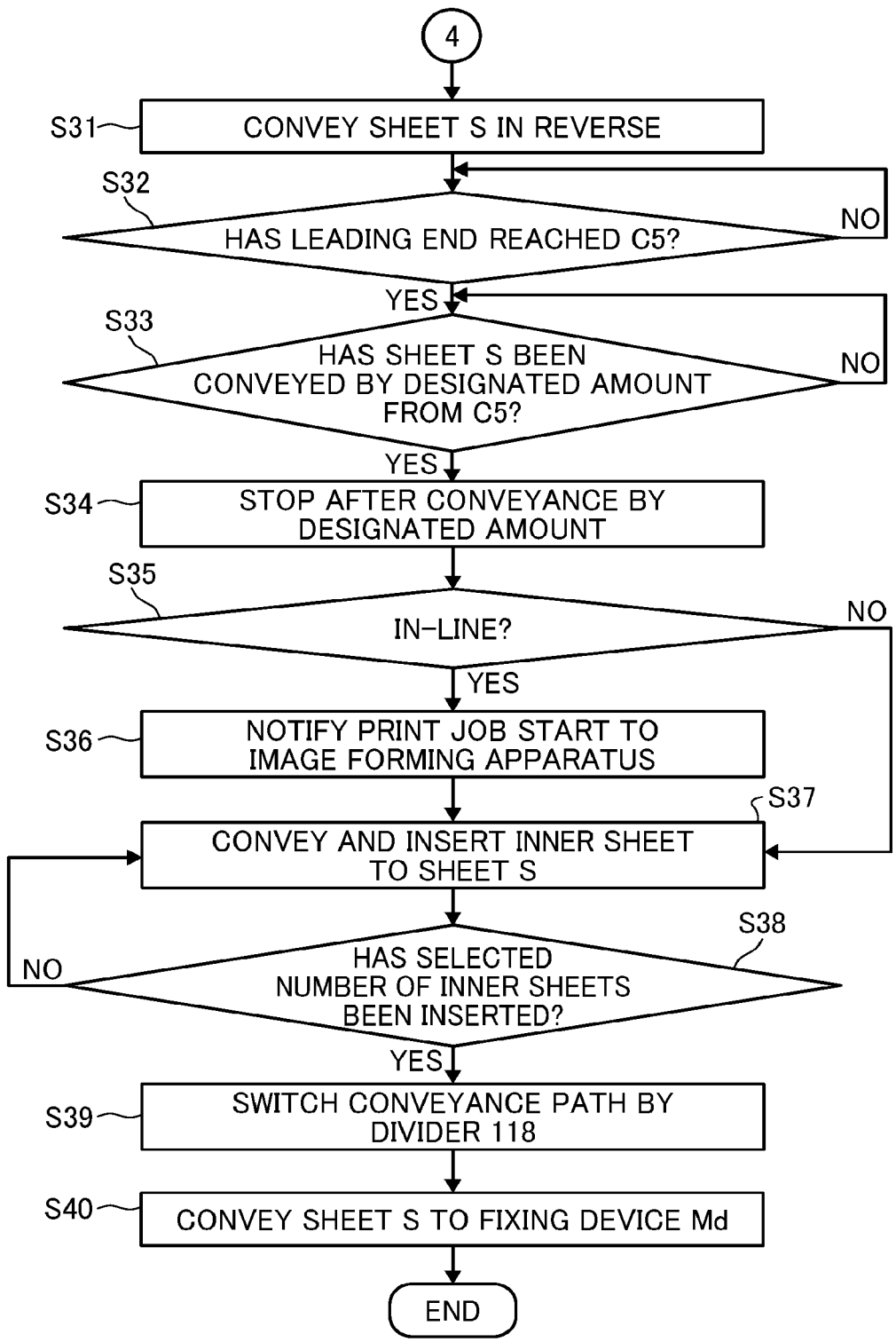

FIG. 29 configured by FIGS. 29A, 29B, and 29C is another flowchart illustrating a series of processes from sheet feeding to insertion of the inner sheet and completion of the laminating process. The description below proceeds while indicating the reference numerals indicated in the flowchart.

First, in step S01a, the controller 500 in the sheet processing device 100 detects the length of the lamination sheet S and the length of the inner sheet P in the conveyance direction from the size detector for the sheet and the size detector for the medium. The controller 500 determines whether the length of the inner sheet P in the conveyance direction is equal to or smaller than half the length of the lamination sheet S in the conveyance direction.

In response to a determination that the length of the inner sheet P in the conveyance direction is equal to or smaller than half the length of the lamination sheet S in the conveyance direction ("Yes" in step S01a), the controller 500 in the sheet processing device 100 starts the multiple insertion mode in step S02a. In step S03a, the controller 500 calculates the number of inner sheets P from the quotient of the size of the lamination sheet S and the size of the inner sheet P.

On the other hand, in response to a determination that the length of the inner sheet P in the conveyance direction is larger than half the length of the lamination sheet S in the conveyance direction ("No" in step S01a), the controller 500 in the sheet processing device 100 starts the single insertion mode.

Since subsequent steps from step S1 are the same as that in the flowchart of FIG. 28, the description thereof is omitted.

The embodiments of the present disclosure are described in detail above. The above-described embodiments are examples and can be modified within the scope not departing from the gist of the present disclosure. For example, embodiments and variations may be combined with each other.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A sheet processing device configured to insert a sheet-shaped medium into a two-ply sheet in which two sheets are overlaid and partially bonded, the sheet processing device comprising:
control circuitry configured to execute:
a single insertion mode in which one sheet-shaped medium is inserted into the two-ply sheet; and
a multiple insertion mode in which a plurality of sheet-shaped media are inserted into the two-ply sheet along a conveyance direction;
wherein the control circuitry is configured to:
cause the one sheet-shaped medium to be inserted into the two-ply sheet with the two-ply sheet being stopped in the single insertion mode; and
cause the plurality of sheet-shaped media to be inserted into the two-ply sheet with the two-ply sheet being stopped in the multiple insertion mode.

2. The sheet processing device according to claim 1, wherein the control circuitry is configured to correct a skew of the sheet-shaped medium by pushing the sheet-shaped medium against the two-ply sheet being stopped.

3. The sheet processing device according to claim 1, wherein the control circuitry is configured to automatically switch to the multiple insertion mode when a length of the sheet-shaped medium in the conveyance direction is half or less of a length of the two-ply sheet in the conveyance direction.

4. The sheet processing device according to claim 1, further comprising:
a first loader configured to load the two-ply sheet;
a sheet size detector configured to detect a length of the two-ply sheet in the conveyance direction;
a second loader configured to load the sheet-shaped medium; and
a medium size detector configured to detect a length of the sheet-shaped medium in the conveyance direction,
wherein the control circuitry is configured to automatically switch to the multiple insertion mode when the length of the sheet-shaped medium in the conveyance direction is half or less of the length of the two-ply sheet in the conveyance direction.

5. The sheet processing device according to claim 1, further comprising a display-and-operation device,
wherein the display-and-operation device is configured to allow a user to select either the single insertion mode or the multiple insertion mode.

6. The sheet processing device according to claim 1, further comprising:
a rotator; and
a conveyor configured to convey the two-ply sheet to the rotator,
wherein the control circuitry is configured to cause the conveyor to wind the two sheets of the two-ply sheet onto the rotator to generate a difference in length at which the two sheets are wound around a circumference of the rotator and separate the two sheets of the two-ply sheet.

7. A laminator comprising:
the sheet processing device according to claim 1; and
a heat pressing member configured to heat and press the two-ply sheet.

8. An image forming apparatus comprising:
an image forming device configured to form an image on the sheet-shaped medium; and
the sheet processing device according to claim 1.

9. An image forming system comprising:
an image forming apparatus; and
the sheet processing device according to claim 1.

10. The image forming system according to claim 9, wherein the sheet processing device is removably attached to the image forming apparatus.

* * * * *